US008213690B2

(12) United States Patent
Okada et al.

(10) Patent No.: US 8,213,690 B2
(45) Date of Patent: Jul. 3, 2012

(54) IMAGE PROCESSING APPARATUS INCLUDING SIMILARITY CALCULATING UNIT, IMAGE PICKUP APPARATUS, AND PROCESSING METHOD FOR THE APPARATUSES

(75) Inventors: Miyuki Okada, Kanagawa (JP); Ryota Kosakai, Tokyo (JP); Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 908 days.

(21) Appl. No.: 12/234,997

(22) Filed: Sep. 22, 2008

(65) Prior Publication Data

US 2009/0087038 A1    Apr. 2, 2009

(30) Foreign Application Priority Data

Oct. 2, 2007    (JP) .................................. 2007-258621

(51) Int. Cl.
*G06K 9/62* (2006.01)
(52) U.S. Cl. ...................................................... 382/118
(58) Field of Classification Search .................. None
See application file for complete search history.

(56) References Cited

U.S. PATENT DOCUMENTS

| 5,982,912 A * | 11/1999 | Fukui et al. .................. 382/118 |
| 2006/0285750 A1 | 12/2006 | Okada et al. |
| 2008/0002862 A1 * | 1/2008 | Matsugu et al. ............. 382/115 |

FOREIGN PATENT DOCUMENTS

| JP | 2004-157932 | 6/2004 |
| JP | 2005-293399 | 10/2005 |
| JP | 2006-4003 | 1/2006 |
| JP | 2006-31388 | 2/2006 |
| JP | 2006-115406 | 4/2006 |
| JP | 2006-202049 | 8/2006 |
| JP | 2007-4313 | 1/2007 |
| JP | 2007-226424 | 9/2007 |
| WO | WO 2006/051607 A1 | 5/2006 |
| WO | WO 2007/043712 A1 | 4/2007 |

OTHER PUBLICATIONS

U.S. Appl. No. 12/541,477, filed Aug. 14, 2009, Okada.
Japanese Office Action issued Nov. 22, 2011, in Patent Application No. 2007-258621 (with English-language translation).
Takio Kurita, et al., "Integration of Viewpoint Dependent Classifiers for Viewpoint Invariant Face Recognition", Information and Communication Engineers technical research report, vol. 99, No. 514, Dec. 16, 1999, pp. 35-42.

(Continued)

*Primary Examiner* — Brian P Werner
(74) *Attorney, Agent, or Firm* — Oblon, Spivak, McClelland, Maier & Neustadt, L.L.P.

(57) ABSTRACT

An image processing apparatus includes an object-feature-information storage unit configured to store feature information of a predetermined object; an image inputting unit configured to input an image; an object detecting unit configured to detect an object contained in the input image; an attribute determining unit configured to determine an attribute of the detected object; a feature-point determining unit configured to determine, according to the determined attribute, positions of feature points to be set in the input image; and a similarity calculating unit configured to calculate, by comparing feature information stored in the object-feature-information storage unit to feature information at feature points set in the input image, similarity between an object corresponding to the feature information stored in the object-feature-information storage unit and the detected object.

22 Claims, 28 Drawing Sheets

OTHER PUBLICATIONS

Office Action dated Feb. 21, 2012 issued in Japanese Patent Application No. 2007-258621 (with English translation).

Takio Kurita. Integration of Plurality of Identifying Units Based on Orientation for Recognizing Face Picture That Is Not Based on Orientation. The Institute of Electronics, Information and Communication Engineers, Japan. Dec. 16, 1999, vol. 99, No. 514, pp. 35-42. (with English abstract).

* cited by examiner

FIG. 4A
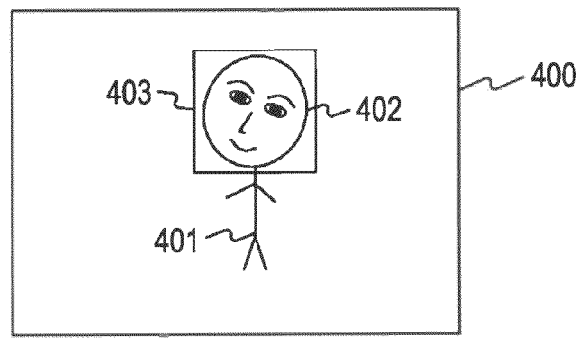
FIG. 4B
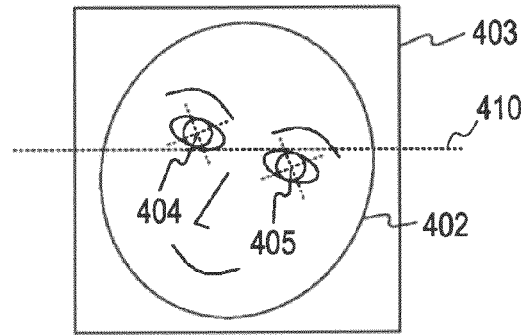
FIG. 4C
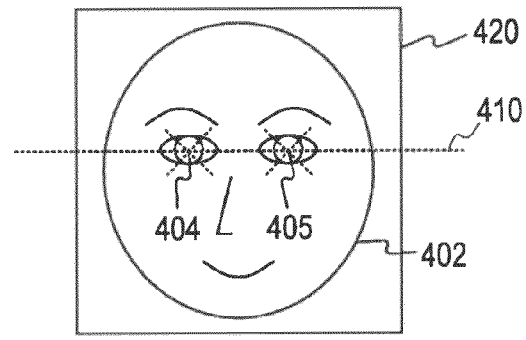

FIG. 6

| | COORDINATE POINT 0 (x,y) IN NORMALIZED FACE IMAGE | | COORDINATE POINT 1 (x,y) IN NORMALIZED FACE IMAGE | | THRESHOLD (θ) FOR LEVEL DIFFERENCE BETWEEN COORDINATE POINTS 0 AND 1 | WEIGHT (α) OF REFERENCE DATA |
|---|---|---|---|---|---|---|
| | x | y | x | y | | |
| REFERENCE DATA 0 | ... | ... | ... | ... | ... | ... |
| REFERENCE DATA 1 | ... | ... | ... | ... | ... | ... |
| REFERENCE DATA 2 | ... | ... | ... | ... | ... | ... |
| ... | ... | ... | ... | ... | ... | ... |
| REFERENCE DATA n−1 | ... | ... | ... | ... | ... | ... |

| ID No. | SMILE/NON-SMILE | | MALE/FEMALE (SEX) | | ADULT/CHILD (GENERATION) | | |
|---|---|---|---|---|---|---|---|
| | 471 | | 472 | | 473 | | |
| 001 | NON-SMILE | −110 | FEMALE | 335 | AMBIGUOUS | −4 | ⋮ |
| 002 | SMILE | 160 | MALE | −215 | ADULT | −258 | ⋮ |
| 003 | AMBIGUOUS | 9 | AMBIGUOUS | 18 | AMBIGUOUS | 5 | ⋮ |
| 004 | SMILE | 235 | MALE | −195 | CHILD | 239 | ⋮ |
| 005 | AMBIGUOUS | 19 | FEMALE | 355 | ADULT | −228 | ⋮ |
| ⋮ | ⋮ | ⋮ | ⋮ | ⋮ | ⋮ | ⋮ | ⋮ |

470

FREQUENCY (BAND)

ANGULAR DIRECTION

FIG. 15

| ID No. | SMILE/ NON-SMILE | MALE/ FEMALE (SEX) | ADULT/ CHILD (GENERATION) | EYE OPEN/ CLOSED | FACE DIRECTION | FACIAL HAIR | GLASSES | FACIAL FEATURE INFORMATION |
|---|---|---|---|---|---|---|---|---|
| 1001 | NON-SMILE | FEMALE | ADULT | OPEN | FORWARD | NO | NO | ☐ |
| 1002 | SMILE | MALE | ADULT | CLOSED | FORWARD | YES | YES | ☐ |
| 1003 | SMILE | FEMALE | ADULT | OPEN | FORWARD | NO | NO | ☐ |
| 1004 | AMBIGUOUS | MALE | ADULT | OPEN | RIGHTWARD | NO | YES | ☐ |
| 1005 | AMBIGUOUS | MALE | CHILD | OPEN | LEFTWARD | NO | NO | ☐ |
| ... | ... | ... | ... | ... | ... | ... | ... | ... |

IMAGE PROCESSING APPARATUS INCLUDING SIMILARITY CALCULATING UNIT, IMAGE PICKUP APPARATUS, AND PROCESSING METHOD FOR THE APPARATUSES

CROSS REFERENCES TO RELATED APPLICATIONS

The present invention contains subject matter related to Japanese Patent Application JP 2007-258621 filed in the Japanese Patent Office on Oct. 2, 2007, the entire contents of which are incorporated herein by reference.

BACKGROUND OF THE INVENTION

1. Field of the Invention

The present invention relates to image processing apparatuses, and particularly to an image processing apparatus and an image pickup apparatus for recognizing a predetermined object contained in an image, a processing method for the apparatuses, and a program for causing a computer to execute the processing method.

2. Description of the Related Art

Recently, image pickup apparatuses, such as a digital still camera, a digital video camera, and a small camera in a cellular phone, have become more sophisticated. As a capability of such image pickup apparatuses, a subject recognition technique for recognizing what the subject is has attracted attention in recent years. As an example of the subject recognition technique, there is proposed a face detection technique in which a human face is detected from a picked-up image through image processing.

As an example of the face detection technique, there is proposed a technique in which a human face is detected by extracting part of a picked-up image, comparing the extracted image with a template, and calculating the probability that the extracted image is a human face image (see, e.g., FIG. 1 of Japanese Unexamined Patent Application Publication No. 2007-4313).

Additionally, there is proposed a technique (so-called face recognition technique) for identifying whether a face detected using a face detection technique is a face of a specific person.

For example, there is proposed an image processing apparatus in which pixels evenly spaced on a face contained in an input image are detected as feature points of the face, local feature information at the feature points is detected by a Gabor filter, the degree of similarity of the detected feature information to facial feature information registered in advance is computed, and thus a person's face is identified (see, e.g., FIG. 2 of Japanese Unexamined Patent Application Publication No. 2006-4003).

SUMMARY OF THE INVENTION

With the related art described above, it is possible to detect local feature information at feature points evenly spaced on a face contained in an input image, and thus to identify a person's face using the detected feature information.

However, there are generally certain differences between human adults and children in terms of the positions of facial organs, such as eyes, nose, and mouth, relative to the facial contour, and the ratios of such organs to the entire face. Also, adults' faces are generally greater in length than children's faces. Additionally, there are differences among individuals, for example, in terms of facial expression, sex, open/closed state of eyes, race, the presence or absence and type of glasses, the presence or absence and type of facial hair (e.g., mustache), and face direction. Thus, such characteristics vary depending on the person whose image is contained in a picked-up image. Therefore, to improve accuracy in calculating the similarity of an object to be recognized, it is important to set appropriate feature points according to an attribute of a person's face to be recognized.

It is thus desirable to improve accuracy in calculating the similarity of an object to be recognized.

The present invention addresses the above-identified and other problems associated with the related art. According to an embodiment of the present invention, there are provided an image processing apparatus, a processing method for the image processing apparatus, and a program for causing a computer to execute the processing method. The image processing apparatus includes object-feature-information storage means for storing feature information of a predetermined object; image inputting means for inputting an image; object detecting means for detecting an object contained in the input image; attribute determining means for determining an attribute of the detected object; feature-point determining means for determining, according to the determined attribute, positions of feature points to be set in the input image; and similarity calculating means for calculating, by comparing feature information stored in the object-feature-information storage means to feature information at feature points set in the input image, similarity between an object corresponding to the feature information stored in the object-feature-information storage means and the detected object. Thus, when an object contained in an input image is detected, an attribute of the detected object is determined. According to the determined attribute, positions of feature points to be set in the input image are determined. Then, feature information stored in the object-feature-information storage means is compared to feature information at feature points set in the input image. It is thus made possible to calculate similarity between an object corresponding to the feature information stored in the object-feature-information storage means and the detected object.

The image processing apparatus according to this embodiment of the present invention may further include feature-point-coordinate-table holding means for holding initial positions of feature points to be set in the input image. According to the determined attribute, the feature-point determining means may move the initial positions of the feature points or increase or decrease the number of the initial positions of the feature points so as to determine positions of feature points to be set in the input image. Thus, by moving the initial positions of the feature points or increasing or decreasing the number of the initial positions of the feature points according to the determined attribute, positions of feature points to be set in the input image can be determined.

The image processing apparatus according to this embodiment of the present invention may further include normalizing means for normalizing an object image that is an image of the detected object and a surrounding area thereof such that the detected object is located at a predetermined position. The feature-point determining means may determine positions of feature points to be set in the normalized object image, according to the determined attribute. Thus, it is made possible to normalize the object image such that the detected object is located at a predetermined position, and to determine positions of feature points to be set in the normalized object image, according to the determined attribute.

The image processing apparatus according to this embodiment of the present invention may further include feature-information extracting means for extracting feature information at feature points set in the input image. Thus, it is made possible to extract feature information at feature points set in the input image.

In the image processing apparatus according to this embodiment of the present invention, the feature-information extracting means may use a feature-information extracting filter to extract feature information for each of the feature points set in the input image, with respect to each local image that is an image including a feature point and an area surrounding the feature point. Thus, with respect to each local image, feature information for each feature point can be extracted using a feature-information extracting filter.

In the image processing apparatus according to this embodiment of the present invention, the feature-information extracting means may change, according to the determined attribute, parameters of the feature-information extracting filter for use in extracting the feature information. Thus, parameters of the feature-information extracting filter can be changed according to the determined attribute.

In the image processing apparatus according to this embodiment of the present invention, the feature-information extracting filter may be a Gabor filter. According to the determined attribute, the feature-information extracting means may change a passband or a feature-information extraction angle, each of which is a parameter of the Gabor filter. Thus, a passband or a feature-information extraction angle, each of which is a parameter of the Gabor filter, can be changed according to the determined attribute.

The image processing apparatus according to this embodiment of the present invention may further include feature-information registering means for determining, according to the calculated similarity, whether feature information extracted for the input image satisfies a predetermined condition and storing, if it is determined that the predetermined condition is satisfied, the feature information extracted for the input image in the object-feature-information storage means. Thus, it is made possible to determine, according to the calculated similarity, whether feature information extracted for the input image satisfies a predetermined condition, and to store, if it is determined that the predetermined condition is satisfied, the feature information extracted for the input image in the object-feature-information storage means.

In the image processing apparatus according to this embodiment of the present invention, if it is determined that the predetermined condition is satisfied, the feature-information registering means may store the determined attribute as well as the feature information extracted for the input image in the object-feature-information storage means. Thus, if it is determined that a predetermined condition is satisfied, the determined attribute as well as the feature information extracted for the input image can be stored in the object-feature-information storage means.

In the image processing apparatus according to this embodiment of the present invention, the similarity calculating means may use a plurality of weak discriminators to compare feature information stored in the object-feature-information storage means to feature information at feature points set in the input image, thereby calculating the similarity. Thus, similarity can be calculated by using a plurality of weak discriminators to compare feature information stored in the object-feature-information storage means to feature information at feature points set in the input image.

In the image processing apparatus according to this embodiment of the present invention, according to the determined attribute, the similarity calculating means may change the number or type of the weak discriminators used to calculate the similarity. Thus, the number or type of the weak discriminators can be changed according to the determined attribute.

The image processing apparatus according to this embodiment of the present invention may further include object-attribute storage means for storing an attribute of a predetermined object. The similarity calculating means may compare the determined attribute to an attribute stored in the object-attribute storage means so as to determine similarity in attribute between the detected object and an object whose attribute is stored in the object-attribute storage means and, according to the determined similarity in attribute, determine whether to calculate similarity of the detected object. Thus, by comparing the determined attribute to an attribute stored in the object-attribute storage means, it is possible to determine similarity in attribute between the detected object and an object whose attribute is stored in the object-attribute storage means and, according to the determined similarity in attribute, determine whether similarity of the detected object is to be calculated.

In the image processing apparatus according to this embodiment of the present invention, the object detecting means may detect a person's face contained in the input image. Thus, it is made possible to detect a person's face contained in the input image.

In the image processing apparatus according to this embodiment of the present invention, the attribute determining means may determine at least one of a facial expression, an age or a generation, sex, an open or closed state of eyes, race, the presence or absence and type of glasses, the presence or absence and type of facial hair, the presence or absence and type of headwear, the presence or absence and type of accessory, hairstyle, and a face direction as an attribute of the detected person's face. Thus, it is made possible to determine at least one of a facial expression, an age or a generation, sex, an open or closed state of eyes, race, the presence or absence and type of glasses, the presence or absence and type of facial hair, the presence or absence and type of headwear, the presence or absence and type of accessory, hairstyle, and a face direction as an attribute of the detected person's face.

In the image processing apparatus according to this embodiment of the present invention, the attribute determining means may sequentially determine a plurality of attributes of the detected object and select an attribute to be subsequently determined according to an attribute already determined. Thus, it is made possible to sequentially determine a plurality of attributes of the detected object and select an attribute to be subsequently determined according to an attribute already determined.

According to another embodiment of the present invention, there are provided an image processing apparatus, a processing method for the image processing apparatus, and a program for causing a computer to execute the processing method. The image processing apparatus includes object-feature-information storage means for storing feature information of a predetermined object; image inputting means for inputting an image; object detecting means for detecting an object contained in the input image; attribute determining means for determining an attribute of the detected object; similarity calculating means for comparing, by using a plurality of weak discriminators whose number or type is determined according to the determined attribute, feature information stored in the object-feature-information storage means to feature information at feature points set in the input image, thereby calculating similarity between an object corresponding to the feature information stored in the object-feature-information storage means and the detected object. Thus, when an object contained in an input image is detected, an attribute of the detected object is determined. By using a plurality of weak discriminators whose number or type is determined according to the determined attribute, feature information stored in the object-feature-information storage means is compared to feature information at feature points set in the input image. It is thus made possible to calculate similarity between an object corresponding to the feature information stored in the object-feature-information storage means and the detected object.

According to still another embodiment of the present invention, there are provided an image pickup apparatus, a processing method for the image pickup apparatus, and a program for causing a computer to execute the processing method. The image pickup apparatus includes object-feature-information storage means for storing feature information of a predetermined object; image pickup means for converting light incident from a subject into a picked-up image; object detecting means for detecting an object contained in the picked-up image; attribute determining means for determining an attribute of the detected object; feature-point determining means for determining, according to the determined attribute, positions of feature points to be set in the input image; and similarity calculating means for comparing feature information stored in the object-feature-information storage means to feature information at feature points set in the picked-up image, thereby calculating similarity between an object corresponding to the feature information stored in the object-feature-information storage means and the detected object. Thus, when an object contained in a picked-up image is detected, an attribute of the detected object is determined. According to the determined attribute, positions of feature points to be set in the picked-up image are determined. Then, feature information stored in the object-feature-information storage means is compared to feature information at feature points set in the picked-up image. It is thus made possible to calculate similarity between an object corresponding to the feature information stored in the object-feature-information storage means and the detected object.

The present invention provides an excellent effect of improving accuracy in calculating the similarity of an object.

BRIEF DESCRIPTION OF THE DRAWINGS

FIG. 4A to FIG. 4C illustrate an example of normalization performed on a face image which is an image of a face detected by the face detector and an area around the detected face.

FIG. 6 illustrates a structure of an attribute determination dictionary used in performing facial attribute determination on a normalized face image.

FIG. 8 shows determination results and resultant summation values for each attribute.

FIG. 15 schematically illustrates each information stored in the facial feature information RAM.

DESCRIPTION OF THE PREFERRED EMBODIMENTS

Embodiments of the present invention will now be described in detail with reference to the drawings.

Figure 1:
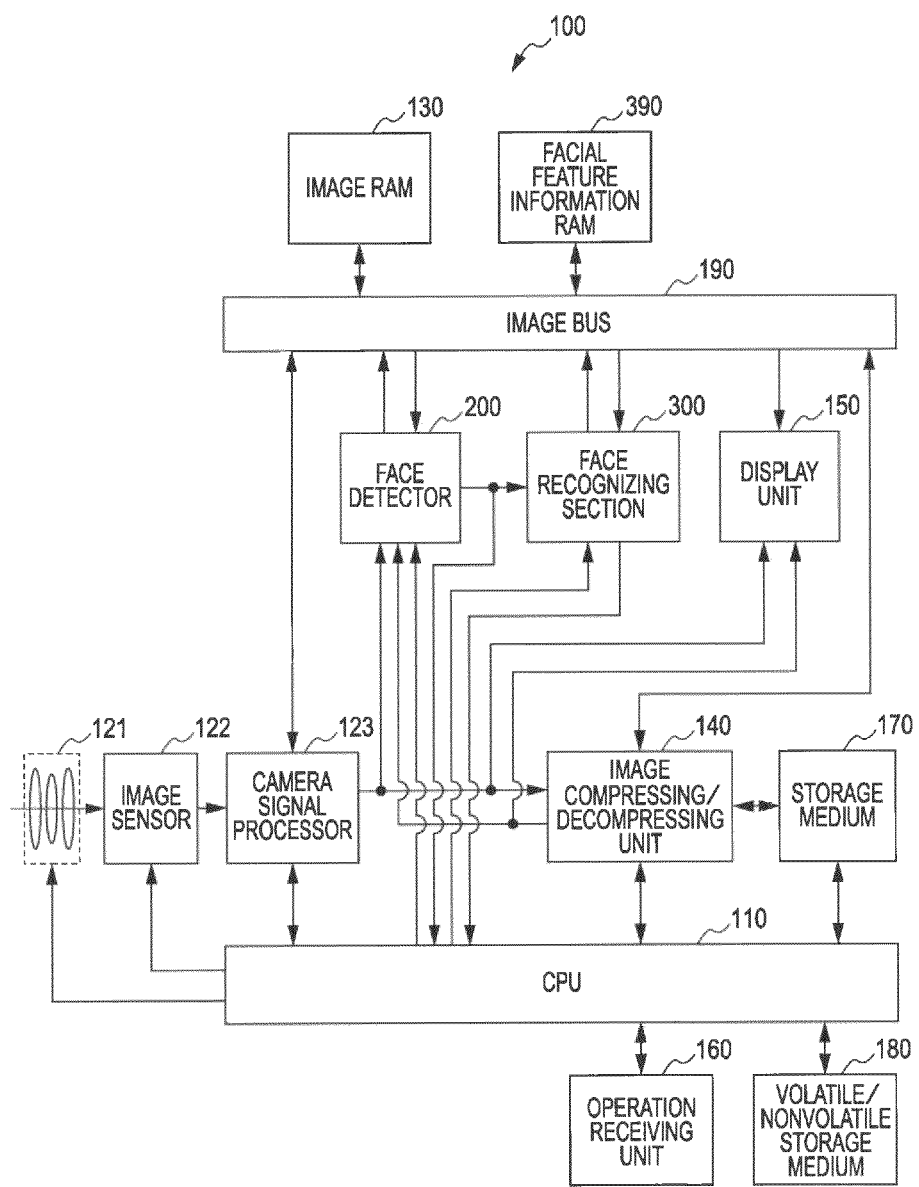
FIG. 1 is a block diagram illustrating a functional configuration of an image pickup apparatus.

FIG. 1 is a block diagram illustrating a functional configuration of an image pickup apparatus 100 according to an embodiment of the present invention. Examples of the image pickup apparatus 100 include a digital still camera, a digital video camera, and a camera included in a cellular phone or a terminal, such as a personal computer.

The image pickup apparatus 100 includes a central processing unit (CPU) 110, a lens unit 121, an image sensor 122, a camera signal processor 123, an image RAM 130, an image compressing/decompressing unit 140, a display unit 150, an operation receiving unit 160, a storage medium 170, a volatile/nonvolatile storage medium 180, an image bus 190, a face detector 200, a face recognizing section 300, and a facial feature information RAM 390. In the image pickup apparatus 100, transmission and reception of image signals between blocks are made either directly or indirectly via the image bus 190 or the image RAM 130 serving as a shared memory.

The CPU 110 controls each part of the image pickup apparatus 100 according to various control programs stored in a memory (not shown).

The lens unit 121 includes a plurality of lenses, such as focus and zoom lenses. Incident light from a subject is input through such lenses and output from the lens unit 121 to the image sensor 122. The CPU 110 performs stop control and focus control in the lens unit 121.

The image sensor 122 photoelectrically converts the incident light having passed through the lens unit 121 into an electric signal, and outputs the electric signal to the camera signal processor 123.

The camera signal processor 123 performs various types of signal processing on the electric signal output from the image sensor 122. Then, the camera signal processor 123 outputs the resulting image data to the image RAM 130, image compressing/decompressing unit 140, display unit 150, and face detector 200. Examples of the signal processing performed by the camera signal processor 123 include white balance adjustment, noise reduction, level correction, analog-to-digital (A/D) conversion, and chromatic correction.

The image RAM 130 stores image data to be processed in the image pickup apparatus 100.

The image compressing/decompressing unit 140 compresses or decompresses each input image data according to the image processing performed. For example, image data compressed by the image compressing/decompressing unit 140 is output to and recorded in the storage medium 170. Alternatively, image data decompressed by the image compressing/decompressing unit 140 is output to the image RAM 130, display unit 150, and face detector 200. For example, a Joint Photographic Experts Group (JPEG) format can be adopted as a data compression format.

The display unit 150 displays an image corresponding to image data output from the camera signal processor 123 or the image compressing/decompressing unit 140.

The operation receiving unit 160 receives various operations performed by a user, and outputs information about the received operation to the CPU 110. The display unit 150 and the operation receiving unit 160 may either be constructed as a single unit, such as a touch panel, or as separate units. In the latter case, for example, the display unit 150 may be a liquid crystal display (LCD), and the operation receiving unit 160 may include hard keys, such as an arrow key and the like.

The storage medium 170 is an image storage medium that stores image data output from the image compressing/decompressing unit 140 and outputs stored image data to the image compressing/decompressing unit 140. Examples of the storage medium 170 include a magnetic disk, an optical disk, a semiconductor storage medium, and a magnetic tape. The storage medium 170 may either be an external removable storage medium or an internal storage medium.

The volatile/nonvolatile storage medium 180 stores various types of information.

The image bus 190 is a common bus for transmission of image data.

The face detector 200 detects a human face contained in an image corresponding to input image data. A face image which is an image of the detected face and its surrounding area is output from the face detector 200 via the image bus 190 to the image RAM 130. At the same time, information about the detected face is output from the face detector 200 to the face recognizing section 300. The face detector 200 will be described in detail below with reference to FIG. 2.

The face recognizing section 300 calculates similarity indicating whether a face detected by the face detector 200 is a face of a person (registered person) whose feature information is stored in the facial feature information RAM 390. Then, the face recognizing section 300 outputs the calculated similarity to the selector 110. The face recognizing section 300 and the facial feature information RAM 390 will be described in detail below with reference to FIG. 3.

The image pickup apparatus 100 may be provided with an input/output terminal so that, under the control of the CPU 110, image data from the image compressing/decompressing unit 140 can be output to an external apparatus, such as an external storage medium, and image data from the external apparatus can be input to the image compressing/decompressing unit 140.

Figure 2:
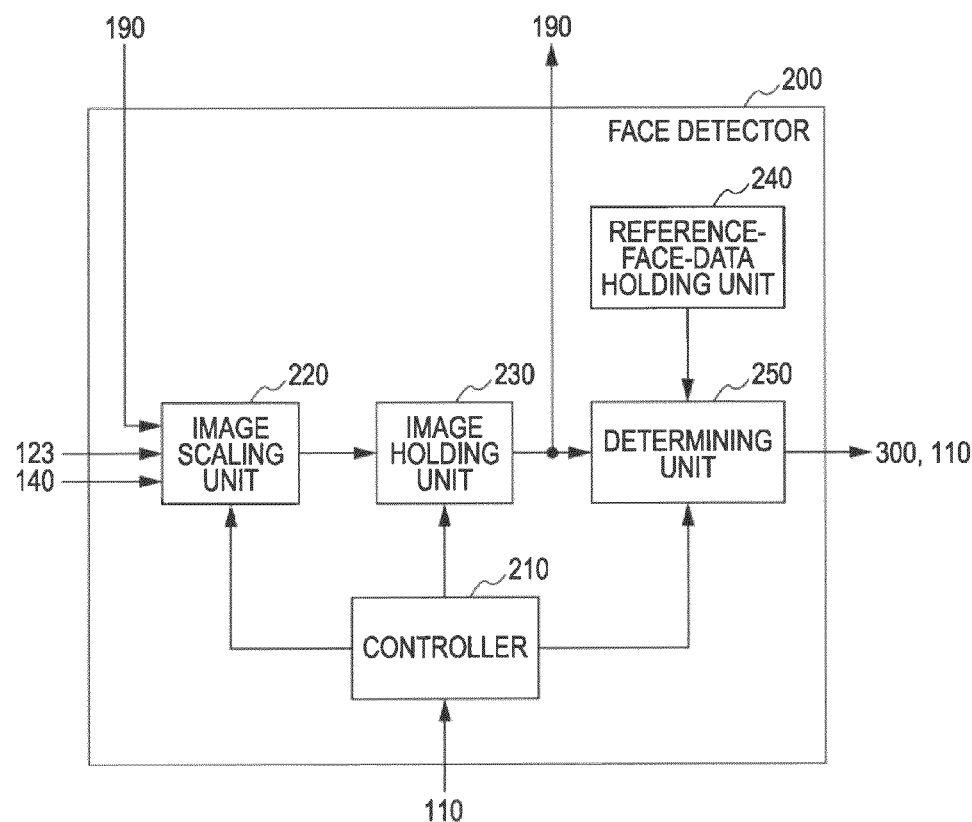
FIG. 2 is a block diagram illustrating a functional configuration of a face detector.

FIG. 2 is a block diagram illustrating a functional configuration of the face detector 200.

The face detector 200 includes a controller 210, an image scaling unit 220, an image holding unit 230, a reference-face-data holding unit 240, and a determining unit 250.

The controller 210 controls each part of the face detector 200 according to instructions from the CPU 110.

The image scaling unit 220 performs enlargement or reduction processing on an image corresponding to image data output from the camera signal processor 123 or image compressing/decompressing unit 140 or image data stored in the image RAM 130 such that the processed image is scaled to a size suitable for face detection. The enlargement or reduction factor is determined according to an instruction from the CPU 110.

The image holding unit 230 is an image memory for holding an image on which enlargement or reduction processing has been performed. The image holding unit 230 outputs an image held therein to the determining unit 250 and also to the image RAM 130 via the image bus 190.

The reference-face-data holding unit 240 holds face data used as a reference in face detection. The reference-face-data holding unit 240 outputs the face data held therein to the determining unit 250. The face data used as a reference is, for example, a face image itself or a feature database containing information about human face features.

The determining unit 250 determines whether an image held in the image holding unit 230 contains a face. Then, the determining unit 250 outputs a face detection result to the CPU 110 and the face recognizing section 300. Specifically, the determining unit 250 extracts a partial image of a predetermined window size from an image held in the image holding unit 230, and performs template matching on the extracted image and face data held in the reference-face-data holding unit 240. Then, according to the level of correlation between the extracted image and the face data in the reference-face-data holding unit 240, the determining unit 250 calculates the probability that the extracted image is a face image. On the basis of the calculated probability, the determining unit 250 determines whether the extracted image is a face image. For example, if the calculated probability is high enough, it is determined that the extracted image is a face image. After the determination is repeated, a face contained in the image held in the image holding unit 230 is detected.

Additionally, according to the level of correlation with the face data held in the reference-face-data holding unit 240, the determining unit 250 extracts various types of data about the face contained in the image held in the image holding unit 230. Then, the determining unit 250 outputs the extracted data as a face detection result to the CPU 110 and the face recognizing section 300. The face detection result include coordinates of the face region, a size of the face region, a direction of the face, and the probability that the image extracted from the image holding unit 230 is a face image. The face detection result is stored in the CPU 110.

Figure 3:
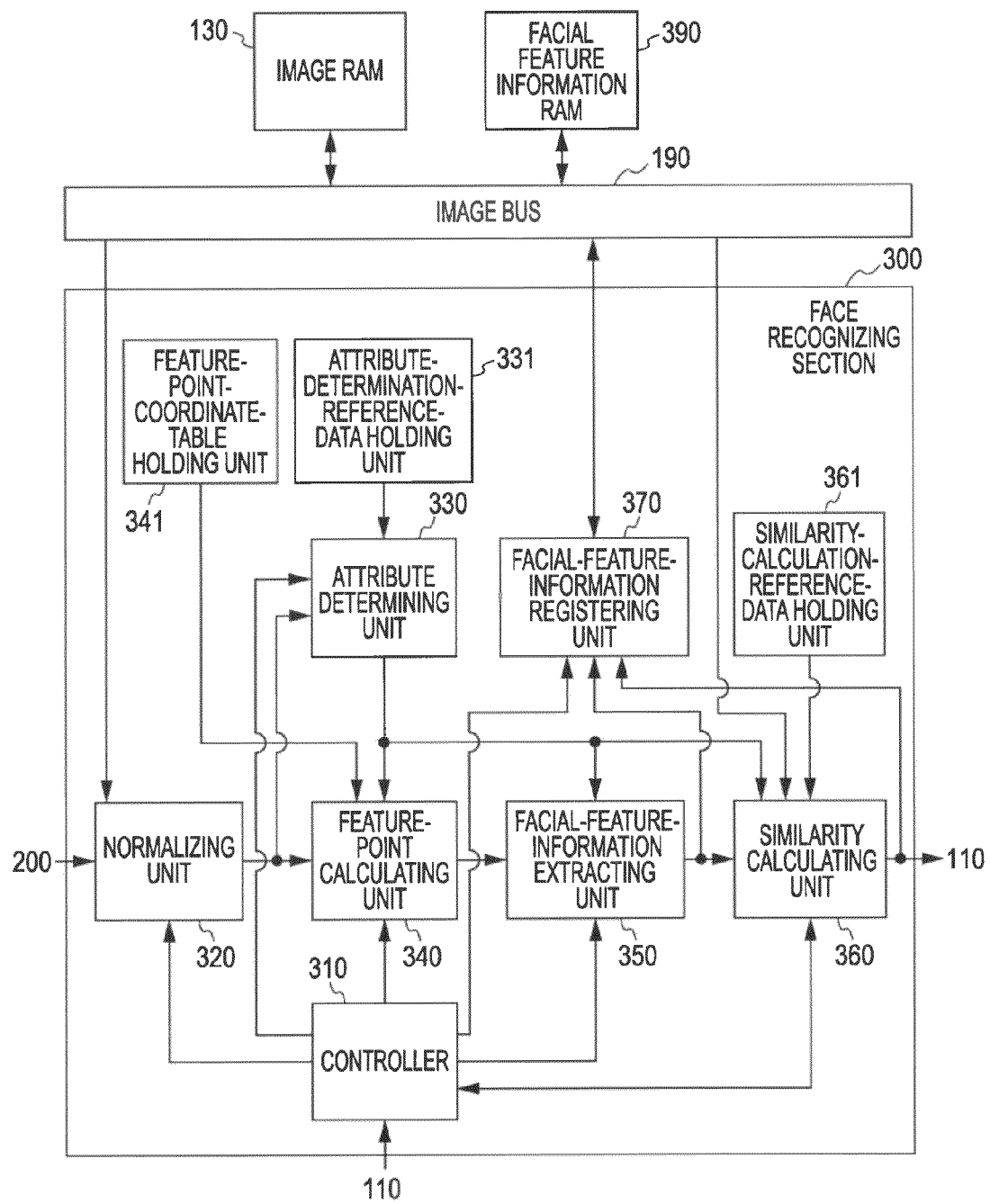
FIG. 3 is a block diagram illustrating a functional configuration of a face recognizing section and its relationship with an image random-access memory (RAM), an image bus, and a facial feature information RAM.

FIG. 3 is a block diagram illustrating a functional configuration of the face recognizing section 300, and a relationship of the face recognizing section 300 with the image RAM 130, the image bus 190, and the facial feature information RAM 390.

The face recognizing section 300 includes a controller 310, a normalizing unit 320, an attribute determining unit 330, an attribute-determination-reference-data holding unit 331, a feature-point calculating unit 340, a feature-point-coordinate-table holding unit 341, a facial-feature-information extracting unit 350, a similarity calculating unit 360, a similarity-calculation-reference-data holding unit 361, and a facial-feature-information registering unit 370. The face recognizing section 300 inputs, via the image bus 190, a face image containing a face contained in an image stored in the image RAM 130. Additionally, the face recognizing section 300 obtains facial feature information stored in the facial feature information RAM 390 to perform similarity calculation, and records new facial feature information satisfying a predetermined condition in the facial feature information RAM 390.

The controller 310 controls each part of the face recognizing section 300 according to instructions from the CPU 110.

The normalizing unit 320 reads a face image from an image stored in the image RAM 130 according to the coordinates and size of a face region contained in a face detection result output from the face detector 200. Then, the normalizing unit 320 normalizes the read face image. The normalizing unit 320 outputs the normalized face image to the attribute determining unit 330 and the feature-point calculating unit 340. Specifically, for example, the normalizing unit 320 performs resolution conversion on a face image read from the image RAM 130 (e.g., into a 64-by-64 pixel image) such that a face contained in the face image is scaled to a predetermined size. At the same time, to keep both eyes in the face aligned substantially horizontally, the normalizing unit 320 rotates the face image to generate a normalized face image. The normalization of a face image will be described in detail below with reference to FIG. 4.

The attribute determining unit 330 uses attribute-determination reference data held in the attribute-determination-reference-data holding unit 331 to determine an attribute of the face contained in the normalized face image output from the normalizing unit 320. Then, the attribute determining unit 330 outputs a determination result to the feature-point calculating unit 340, the facial-feature-information extracting unit 350, and the similarity calculating unit 360. For example, for a normalized face image output from the normalizing unit 320, the attribute determining unit 330 calculates the extent to which attribute-determination reference data held in the attribute-determination-reference-data holding unit 331 is satisfied. Thus, a resultant summation value for each attribute is obtained. Examples of the facial attribute determined by the attribute determining unit 330 include facial expression, age or generation, sex, open/closed state of eyes, race, the presence or absence and type of glasses, the presence or absence and type of facial hair, the presence or absence and type of headwear (e.g., hat), the presence or absence and type of accessory, hairstyle, and face direction. Examples of the facial expression include a smiley face, a serious face, a sad face, and an angry face. The determination of facial attributes will be described in detail below with reference to FIG. 5 to FIG. 8.

The attribute-determination-reference-data holding unit 331 holds, for each facial attribute, an attribute determination dictionary containing a plurality of items of attribute-determination reference data used by the attribute determining unit 330 in making determinations. The attribute-determination reference data is reference data obtained in advance by sufficient learning of facial attributes to be determined by the attribute determining unit 330. The attribute determination dictionary will be described in detail below with reference to FIG. 6.

According to a determination result output from the attribute determining unit 330, the feature-point calculating unit 340 makes changes to feature point coordinates contained in a feature-point coordinate table held in the feature-point-coordinate-table holding unit 341. The feature-point calculating unit 340 calculates and determines the positions of feature points to be set on a face contained in a normalized face image output from the normalizing unit 320. Then, the feature-point calculating unit 340 outputs, to the facial-feature-information extracting unit 350, the normalized face image containing the calculated positions of feature points. The calculation of the positions of feature points to be set on the face contained in the normalized face image will be described in detail below with reference to FIG. 9 to FIG. 11.

The feature-point-coordinate-table holding unit 341 holds a feature-point coordinate table used by the feature-point calculating unit 340 in calculating the positions of feature points. The feature-point coordinate table will be described in detail below with reference to FIG. 9.

The facial-feature-information extracting unit 350 extracts facial feature information which is feature information at each feature point contained in a normalized face image output from the feature-point calculating unit 340. The facial-feature-information extracting unit 350 outputs the extracted facial feature information to the similarity calculating unit 360 and the facial-feature-information registering unit 370. In an embodiment of the present invention, an extraction method using a Gabor filter will be described as a method for extracting feature information at each feature point. Feature information extracted by the Gabor filter is referred to as a Gabor jet. In an embodiment of the present invention, changes to the Gabor filter are made according to a determination result output from the attribute determining unit 330. The extraction method using the Gabor filter will be described in detail below with reference to FIG. 12 to FIG. 14.

The similarity calculating unit 360 uses similarity-calculation reference data held in the similarity-calculation-reference-data holding unit 361 to compare facial feature information output from the facial-feature-information extracting unit 350 to facial feature information read from the facial feature information RAM 390, and thus calculates similarity therebetween. The calculated similarity indicates whether a face detected by the face detector 200 is a face of a specific person whose facial feature information is stored in the facial feature information RAM 390. The similarity calculating unit 360 outputs the calculated similarity to the CPU 110 and the facial-feature-information registering unit 370. In an embodiment of the present invention, changes to similarity-calculation reference data used in calculating similarity are made according to a determination result output from the attribute determining unit 330. The calculation of the similarity will be described in detail below with reference to FIG. 15 to FIG. 22.

The similarity-calculation-reference-data holding unit 361 holds, for each facial attribute, a similarity calculation dictionary containing a plurality of items of similarity-calculation reference data used by the similarity calculating unit 360 in making determinations. The similarity-calculation reference data is reference data obtained in advance by sufficient learning of facial similarity to be calculated by the similarity calculating unit 360. The similarity calculation dictionary will be described in detail below with reference to FIG. 17.

According to an instruction from the controller 310, the facial-feature-information registering unit 370 registers, in the facial feature information RAM 390, facial feature information output from the facial-feature-information extracting unit 350 and satisfying a predetermined condition. Specifically, registration is performed if the user gives an instruction to register facial feature information of a specific person or if it is determined inside the image pickup apparatus 100 that a predetermined condition for face registration is satisfied. This registration processing will be described in detail below with reference to FIG. 28.

The facial feature information RAM 390 associates, for each person, facial feature information extracted for a face of a specific person with facial attributes determined for the specific person, and stores the facial feature information and facial attributes therein. The facial feature information RAM 390 supplies the stored facial feature information and facial attributes via the image bus 190 to the similarity calculating unit 360. Additionally, for each person, the facial feature information RAM 390 overwrites existing facial feature information with facial feature information output from the facial-feature-information registering unit 370, or adds facial feature information output from the facial-feature-information registering unit 370 to existing facial feature information. The content stored in the facial feature information RAM 390 will be described in detail below with reference to FIG. 15.

Next, normalization of a face image will be described in detail with reference to drawings.

FIG. 4A to FIG. 4C illustrate an example of normalization performed on a face image which is an image of a face detected by the face detector 200 and an area around the detected face.

FIG. 4A illustrates a picked-up image 400 corresponding to image data output from the camera signal processor 123. The picked-up image 400 contains a face 402 of a person 401. When the face 402 in the picked-up image 400 is detected by the face detector 200, the detection result on the face 402 is output from the face detector 200 to the face recognizing section 300. When the face recognizing section 300 receives the detection result on the face 402, a face image 403 containing the face 402 is read from the image RAM 130 and input to the normalizing unit 320.

FIG. 4B and FIG. 4C illustrate a transition from one state to the next, in normalization of the face image 403 containing the face 402 detected by the face detector 200. In this example, a reference position 410 serving as a reference in normalization of the face image 403 is defined. The reference position 410 is used, for example, to convert a face image such that both eyes contained in a face detected by the face detector 200 are kept aligned substantially horizontally and arranged at predetermined positions in a normalized face image.

For example, resolution conversion is performed on the face image 403 extracted from the picked-up image 400 such that the face 402 contained in the face image 403 is scaled to a predetermined size. Additionally, the face image 403 is rotated by affine transformation or the like such that center positions of eyes 404 and 405 contained in the face 402 are made to coincide with the line of the reference position 410, and are kept aligned substantially horizontally. Thus, a normalized face image 420 is generated.

In this embodiment of the present invention, the center positions of both eyes are used as reference in normalization. However, positions of other organs contained in the face may be used as the reference.

Next, facial attribute determination will be described in detail with reference to drawings.

Figure 5A:
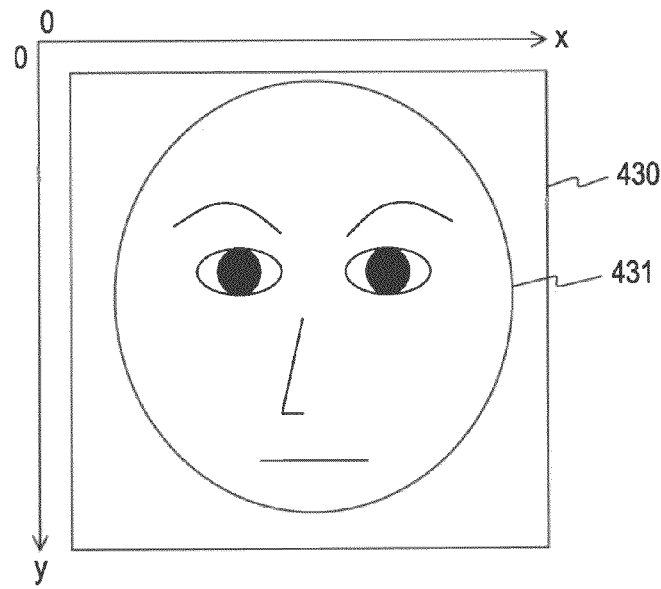
FIG. 5A and FIG. 5B each schematically illustrate a face image to be subjected to attribute determination.
Figure 5B:
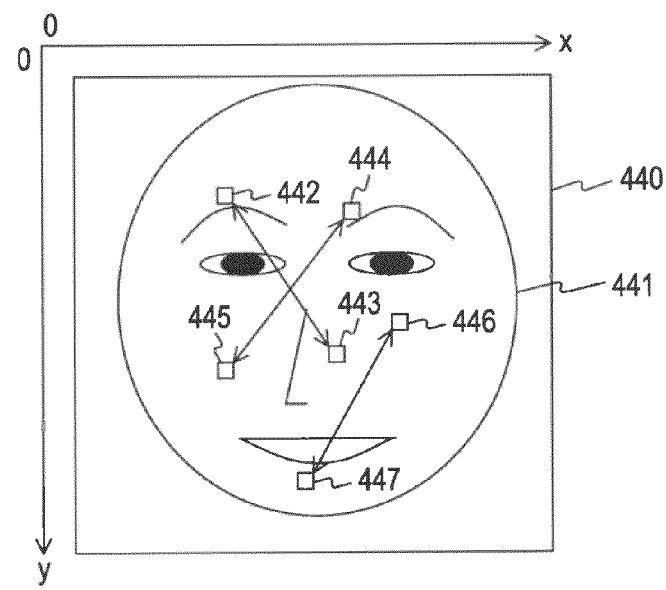

FIG. 5A and FIG. 5B each schematically illustrate a face image to be subjected to attribute determination. FIG. 5A illustrates a normalized face image 430 containing a normal face 431 as a person's face. FIG. 5B illustrates a normalized face image 440 containing a smiley face 441 as a person's face. In a typical smiley face, compared to a normal face, eyes are narrowed, eyebrows or eyes are slanted downward, cheeks are raised, both sides of the nose are horizontally spaced apart, lips are horizontally widened, the mouth is open, and both ends of the mouth are raised. Therefore, attribute-determination reference data corresponding to these features of a smiley face is held in the attribute-determination-reference-data holding unit 331, and used in attribute determination of a smiley face or in determining the degree of smile. This determination method using the attribute-determination reference data will be described in detail below with reference to FIG. 6 to FIG. 8. Positions 442 to 447 shown in FIG. 5B will be described in detail with reference to FIG. 6.

FIG. 6 illustrates a structure of an attribute determination dictionary used in performing facial attribute determination on a normalized face image. In this embodiment of the present invention, a correlation determination method based on pixel differences is used to perform facial attribute determination.

Attribute-determination reference data contained in an attribute determination dictionary 450 includes a coordinate point 0(x,y) 451 and a coordinate point 1(x,y) 452 indicating two positions in a normalized face image, a threshold ($\theta$) 453 for a level difference (brightness difference) between the coordinate points 0 and 1, and a weight ($\alpha$) 454 of reference data. The weight ($\alpha$) 454 is a weighting factor added according to a result of comparison between the threshold ($\theta$) and the level difference between the coordinate points 0 and 1. The attribute determination dictionary 450 stores "n" items of reference data, each reference data item including a combination of the above-described values. Reference data described in this embodiment of the present invention is referred to as weak discriminator (weak hypothesis).

Each value of the attribute-determination reference data is set using 300 to 1000 most effective combinations among those learned by a machine learning algorithm, such as Ada-Boost. Since all attribute determination dictionaries use the same format, a plurality of determining operations can be made using the same algorithm.

Next, an example of facial attribute determination performed on a normalized face image by using an attribute determination dictionary will be described in detail with reference to drawings. In this example, attribute determination using the attribute determination dictionary 450 is performed on the normalized face image 440 of FIG. 5B. In the normalized face image 440 of FIG. 5B, the origin point is at the upper-left corner, the horizontal axis is the X-axis, and the vertical axis is the Y-axis.

For example, in the normalized face image 440, a position stored in the first row (reference data 0) of the attribute determination dictionary 450 and corresponding to values of the coordinate point 0(x,y) 451 is the position 442, and a position stored in the above-described first row and corresponding to values of the coordinate point 1(x,y) 452 is the position 443. Also in the normalized face image 440, a position stored in the second row (reference data 1) of the attribute determination dictionary 450 and corresponding to values of the coordinate point 0(x,y) 451 is the position 444, and a position stored in the above-described second row and corresponding to values of the coordinate point 1(x,y) 452 is the position 445. Also in the normalized face image 440, a position stored in the third row (reference data 2) of the attribute determination dictionary 450 and corresponding to values of the coordinate point 0(x,y) 451 is the position 446, and a position stored in the above-described third row and corresponding to values of the coordinate point 1(x,y) 452 is the position 447.

First, a value of a score S for performing determination is set to zero. Then, computations using values contained in the reference data 0 in the attribute determination dictionary 450 are performed. Specifically, a brightness value A(0) at the position 442 corresponding to the values of the coordinate point 0(x,y) 451 contained in the reference data 0 in the attribute determination dictionary 450 and a brightness value B(0) at the position 443 corresponding to the values of the coordinate point 1(x,y) 452 contained in the reference data 0 in the attribute determination dictionary 450 are extracted. Then, a difference C(0) between the extracted brightness values is calculated by the following expression:

$$C(0)=A(0)-B(0)$$

Next, the calculated difference C(0) between the brightness values is compared to the value of the threshold (θ) 453 contained in the reference data 0 in the attribute determination dictionary 450 to determine whether the calculated value C(0) is greater than the value of the threshold (θ) 453. If the calculated value C(0) is not greater than the value of the threshold (θ) 453, the value of the weight (α) 454 contained in the reference data 0 in the attribute determination dictionary 450 is added to the score S. On the other hand, if the calculated value C(0) is greater than the value of the threshold (θ) 453, the value of the weight (α) 454 contained in the reference data 0 in the attribute determination dictionary 450 is not added to the score S.

Next, computations similar to those described above are performed by using values contained in the reference data 1 in the attribute determination dictionary 450. Specifically, a brightness value A(1) at the position 444 corresponding to the values of the coordinate point 0(x,y) 451 contained in the reference data 1 in the attribute determination dictionary 450 and a brightness value B(1) at the position 445 corresponding to the values of the coordinate point 1(x,y) 452 contained in the reference data 1 in the attribute determination dictionary 450 are extracted. Then, a difference C(1) between the extracted brightness values is calculated by the following expression:

$$C(1)=A(1)-B(1)$$

Next, the calculated difference C(1) between the brightness values is compared to the value of the threshold (θ) 453 contained in the reference data 1 in the attribute determination dictionary 450 to determine whether the calculated value C(1) is greater than the value of the threshold (θ) 453. If the calculated value C(1) is not greater than the value of the threshold (θ) 453, the value of the weight (α) 454 contained in the reference data 1 in the attribute determination dictionary 450 is added to the score S. On the other hand, if the calculated value C(1) is greater than the value of the threshold (θ) 453, the value of the weight (α) 454 contained in the reference data 1 in the attribute determination dictionary 450 is not added to the score S.

The above-described computations are repeated by sequentially using values contained in the reference data 2 to reference data n−1 in the attribute determination dictionary 450.

That is, to perform determination on the normalized face image 440 by using the attribute determination dictionary 450, values contained in the reference data 0 to n−1 in the attribute determination dictionary 450 are sequentially used, and C(i) is calculated by Expression 1 below:

$$C(i)=A(i)-B(i) \quad \text{Expression 1}$$

where the variable "i" is an integer from 0 to n−1, A(i) denotes a brightness value corresponding to the coordinate point 0(x, y) 451 contained in reference data i, and B(i) denotes a brightness value corresponding to the coordinate point 1(x,y) 452 contained in the reference data i. Then, it is determined whether the calculated C(i) satisfies Expression 2 below:

$$C(i)>\theta(i) \quad \text{Expression 2}$$

where θ(i) denotes a value of the threshold (θ) 453 contained in the reference data i.

If the calculated C(i) satisfies Expression 2, the value of α(i) is not added to the score S. If the calculated C(i) does not satisfy Expression 2, the value of α(i) is added to the score S. Here, α(i) denotes a value of the weight (α) 454 contained in the reference data i.

After completion of the computations using values contained in the reference data n−1 in the attribute determination dictionary 450, each attribute is determined according to the value (resultant summation value) of the score S.

Here, a score $S_n(P)$ obtained after completion of the computations using values contained in the reference data 0 to n−1 in the attribute determination dictionary 450 can be expressed by Expression 3 below:

$$S_n(P) = \sum_{i=0}^{n-1} \alpha_i \cdot h(P(x_{i0}, y_{i0}) - P(x_{i1}, y_{i1}) - \theta_i) \quad \text{Expression 3}$$

where $S_n(P)$ denotes a resultant summation value obtained by summation of the reference data 0 to n−1, $\alpha_i$ denotes a value of the weight (α) 454 contained in the reference data i, $P(x_{i0}, y_{i0})$ denotes a brightness value corresponding to the coordinate point 0(x,y) 451 contained in the reference data i, $P(x_{i1}, y_{i1})$ denotes a brightness value corresponding to the coordinate point 1(x,y) 452 contained in the reference data i, $\theta_i$ denotes a value of the threshold (θ) 453 contained in the reference data i, and n denotes the number of items of reference data. Additionally, h(z) denotes a function which gives 0 if z>0 is satisfied, and gives 1 if Z≦0 is satisfied.

Next, with reference to drawings, a detailed description will be given about a method for determining a facial attribute according to a resultant summation value calculated by using values contained in reference data 0 to n−1 in an attribute determination dictionary.

Figure 7A:
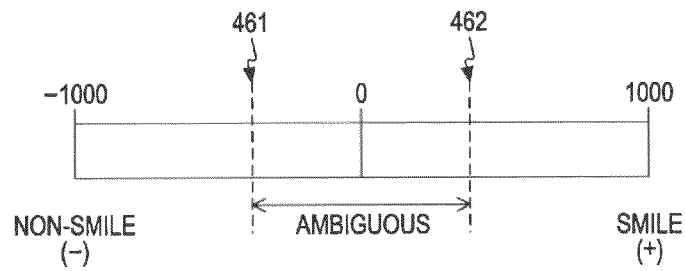
FIG. 7A to FIG. 7C each illustrate a range of a resultant summation value for a given facial attribute determined for a normalized face image by using an attribute determination dictionary.
Figure 7B:
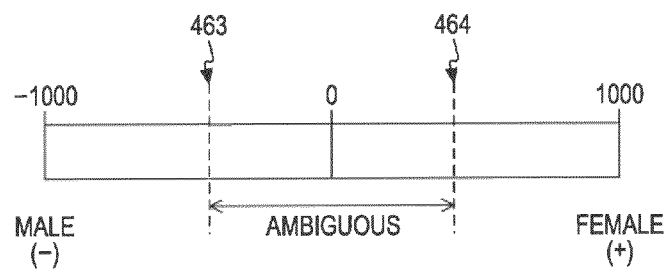
Figure 7C:
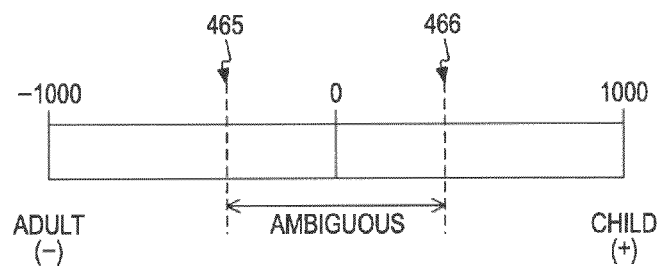

FIG. 7A to FIG. 7C each illustrate a range of a resultant summation value for a given facial attribute determined for a normalized face image by using an attribute determination dictionary. FIG. 7A illustrates a range of a resultant summation value for a facial attribute "smile". FIG. 7B illustrates a range of a resultant summation value for a facial attribute "sex". FIG. 7C illustrates a range of a resultant summation value for a facial attribute "generation". A resultant summation value for a facial attribute in each of FIG. 7A to FIG. 7C ranges, for example, from −1000 to +1000.

For example, in the learning performed by the machine learning algorithm described above, when leaning samples for "smile" are assigned positive values and leaning samples for "non-smile" are assigned negative values, thresholds 461 and 462 of FIG. 7A are used to determine "smile" or "non-smile" as a facial attribute.

For example, in FIG. 7A, in the range of a resultant summation value for "smile", if a score $S_n(P)$, which is a resultant summation value calculated by using values contained in reference data 0 to n−1, is smaller than the threshold 461, the facial attribute is determined to be "non-smile". If the score $S_n(P)$ is greater than the threshold 462, the facial attribute is determined to be "smile". If the score $S_n(P)$ falls within the range from the threshold 461 to the threshold 462, the facial attribute is not determined to be either "smile" or "non-smile" and is determined to be "ambiguous". The attributes shown in FIG. 7B and FIG. 7C can be determined in the same manner as that in the case of FIG. 7A. These determined attributes and resultant summation values are output from the attribute determining unit 330 to the feature-point calculating unit 340, the facial-feature-information extracting unit 350, and the similarity calculating unit 360.

FIG. 8 shows a facial-attribute determination result 470 containing determination results and resultant summation values for each attribute. For each normalized face image corresponding to an identification number (ID No.), determination results and resultant summation values shown in FIG. 8 are output from the attribute determining unit 330. For example, for a facial attribute "smile/non-smile" 471, "smile", "non-smile", or "ambiguous" is output as a determination result, while a value of the score $S_n(P)$ is output as a resultant summation value. Determination results and resultant summation values for facial attributes "male/female (sex)" 472 and "adult/child (generation)" 473 are output in the same manner as those for "smile/non-smile" 471.

Next, calculation of positions of feature points in a normalized face image will be described with reference to drawings.

Figure 9A:
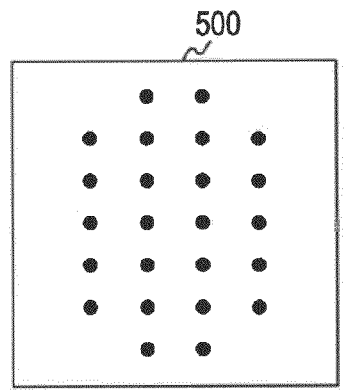
FIG. 9A to FIG. 9C illustrate a method for calculating positions of feature points to be set in a normalized face image generated by a normalizing unit.
Figure 9B:
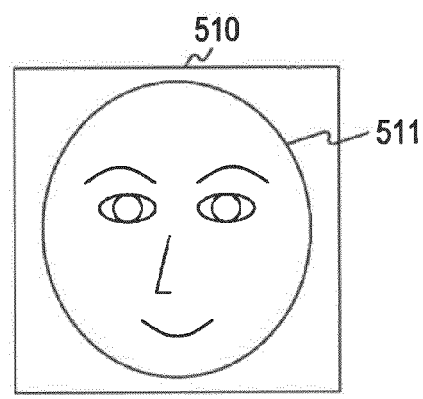
Figure 9C:
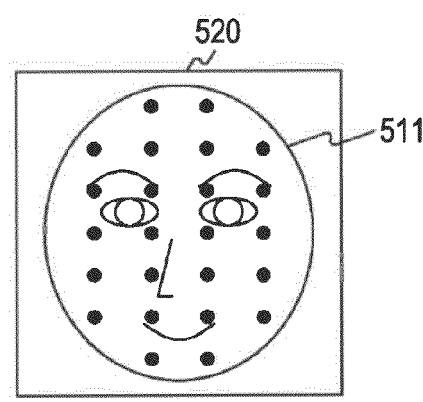

FIG. 9A to FIG. 9C illustrate a method for calculating positions of feature points to be set in a normalized face image generated by the normalizing unit 320. FIG. 9A illustrates a feature-point coordinate table 500 which is an example of a feature-point coordinate table used to calculate positions of feature points to be set in a normalized face image. The feature-point coordinate table 500 holds coordinates of feature points to be set in a normalized face image. The feature-point coordinate table 500 is held in the feature-point-coordinate-table holding unit 341. In FIG. 9A, the size of a normalized face image in which feature points are to be set is represented by an open rectangle, and a position corresponding to a coordinate point at which a feature point is to be set is indicated by a filled circle. Here, coordinates suitable for an adult's face image are used as initial values for feature point coordinates. For illustrative purposes, FIGS. 9A to 9C, FIGS. 10A to 10F, and FIGS. 11A to 11C show feature points smaller in number than those actually used.

FIG. 9B illustrates a normalized face image 510 which is an example of a normalized face image generated by the normalizing unit 320. Here, a face 511 contained in the normalized face image 510 is a relatively normal adult's face. FIG. 9C illustrates a normalized face image 520 obtained by setting feature points at coordinates contained in the feature-point coordinate table 500 of FIG. 9A. In FIG. 9C, feature points arranged in the normalized face image 520 are indicated by filled circles. Thus, when a face contained in the normalized face image 510 generated by the normalizing unit 320 is a relatively normal adult's face, feature points can be set at relatively appropriate positions by setting feature points at positions corresponding to coordinates contained in the feature-point coordinate table 500.

However, although a normalized face image on which similarity calculation is to be performed is normalized on the basis of the positions of both eyes, there are often variations in each part depending on the attribute of a person contained in the normalized face image. Therefore, it may be difficult to uniquely define coordinates of feature points to be set in a normalized face image. Thus, in this embodiment of the present invention, positions at which feature points are to be set are changed or added according to a facial attribute determined by the attribute determining unit 330 such that the positions are suitable for a face contained in a normalized face image.

Figure 10A:
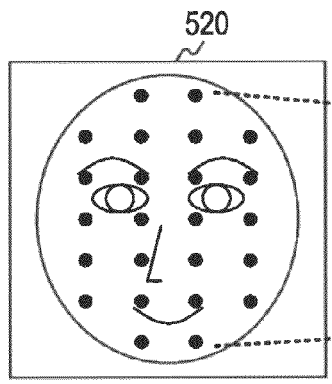
FIG. 10A to FIG. 10F each illustrate an arrangement of feature points set in a normalized face image generated by the normalizing unit.
Figure 10B:
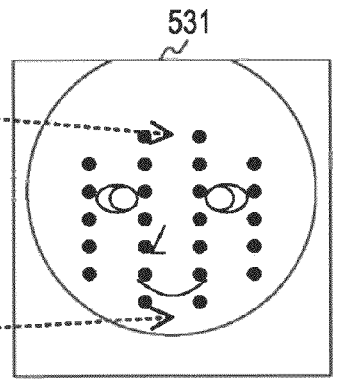
Figure 10C:
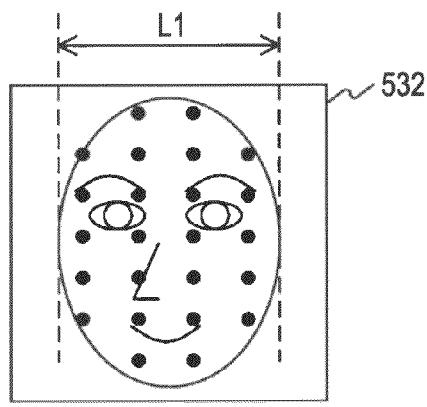
Figure 10D:
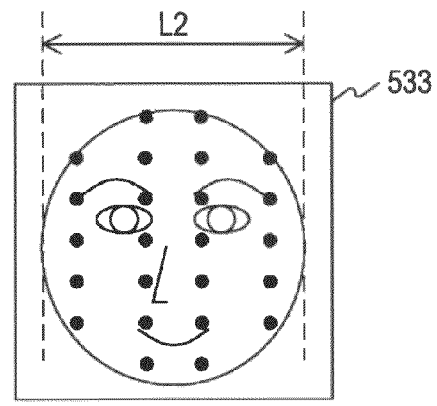
Figure 10E:
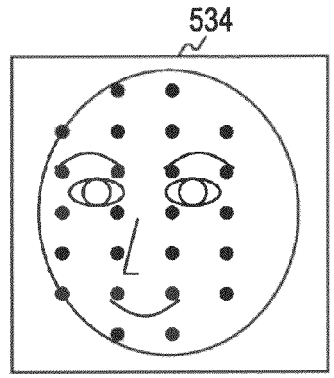
Figure 10F:
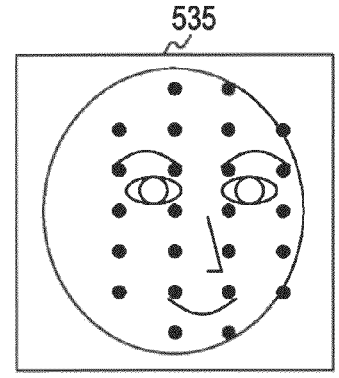

FIG. 10A to FIG. 10F each illustrate an arrangement of feature points set in a normalized face image generated by the normalizing unit 320. The normalized face image 520 illustrated in FIG. 10A is the same as that illustrated in FIG. 9C. FIG. 10B illustrates a normalized face image 531 containing a child's face. FIG. 10C illustrates a normalized face image 532 containing a Westerner's face. FIG. 10D illustrates a normalized face image 533 containing an Asian face. FIG. 10E illustrates a normalized face image 534 containing a leftward-directed face. FIG. 10F illustrates a normalized face image 535 containing a rightward-directed face.

As illustrated in FIG. 10B, in a typical child's face, facial organs, such as eyes, nose, and mouth, are often close to each other at the center. Therefore, when a generation-related facial attribute is determined to be "child" (when the degree of being a child is relatively high), distances between adult's feature points (i.e., positions corresponding to coordinates contained in the feature-point coordinate table 500) are reduced in a vertical direction or increased in a horizontal direction, according to the degree of being a child (i.e., according to the resultant summation value). This is because adults' faces are generally greater in length than children's faces.

As illustrated in FIG. 10C, Westerners' faces are generally relatively long. On the other hand, as illustrated in FIG. 10D, Asian faces are generally relatively round. For example, a horizontal width L2 of the Asian face contained in the normalized face image 533 is greater than a horizontal width L1 of the Westerner's face contained in the normalized face image 532. Therefore, according to the determined race-related facial attribute, distances between positions corresponding to coordinates contained in the feature-point coordinate table 500 are reduced or increased in the horizontal direction.

As illustrated in FIG. 10E or FIG. 10F, in the leftward-directed or right-directed face, facial organs, such as eyes, nose, and mouth, are located on the left or right side depending on the face direction. Therefore, according to the determined face-direction-related facial attribute, positions corresponding to coordinates contained in the feature-point coordinate table 500 are moved in the horizontal direction. As illustrated in FIG. 10B to FIG. 10F, by changing the positions of feature points according to the determined facial attribute, feature points best suited for the face to be subjected to similarity calculation can be set, and highly accurate calculation of feature points can be made. Thus, accuracy in person recognition can be further improved.

Figure 11A:
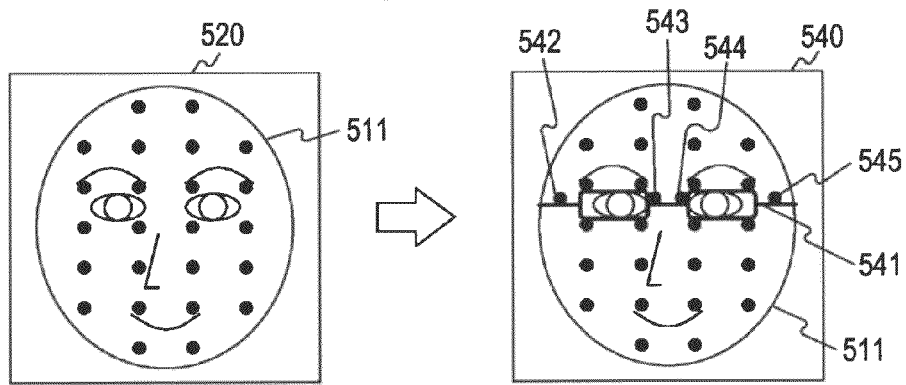
FIG. 11A to FIG. 11C each illustrate an arrangement of feature points set in a normalized face image generated by the normalizing unit.
Figure 11B:
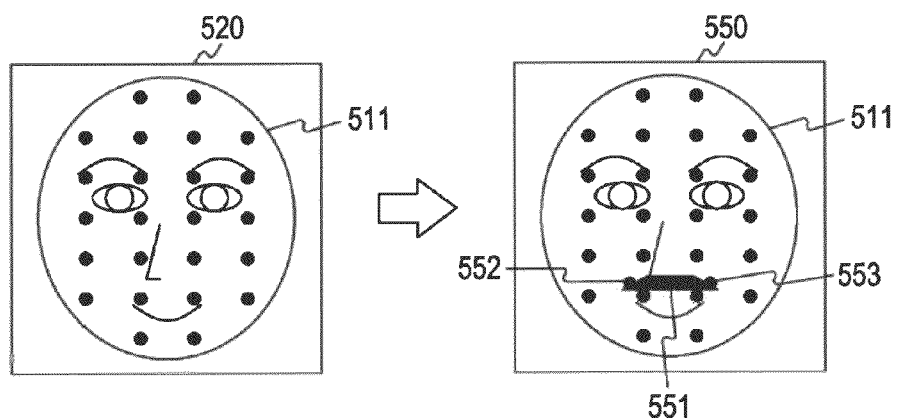
Figure 11C:
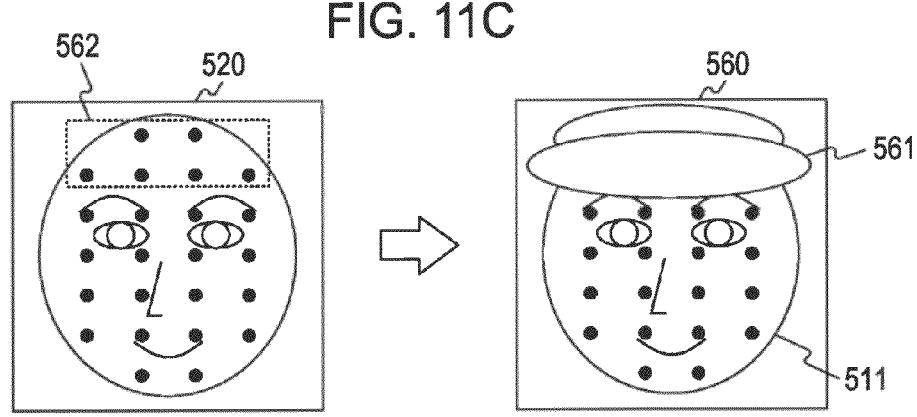

FIG. 11A to FIG. 11C each illustrate an arrangement of feature points set in a normalized face image generated by the normalizing unit 320. The normalized face image 520 illustrated in FIG. 11A to FIG. 11C is the same as that illustrated in FIG. 9C.

A normalized face image 540 illustrated in FIG. 11A is obtained by adding glasses 541 to the face 511 contained in the normalized face image 520. A normalized face image 550 illustrated in FIG. 11B is obtained by adding facial hair (mustache) 551 to the face 511 contained in the normalized face image 520. A normalized face image 560 illustrated in FIG. 11C is obtained by adding headwear (hat) 561 to the face 511 contained in the normalized face image 520.

As illustrated in FIG. 11A, as an attribute of the detected face, if the presence of glasses has a high resultant summation value (e.g., if it is determined that glasses are present), additional feature points are provided at positions which are assumed to be around the glasses. For example, additional feature points 542 to 545 are arranged around the glasses 541. As illustrated in FIG. 11B, as an attribute of the detected face, if facial hair has a high resultant summation value (e.g., if it is determined that facial hair is present), additional feature points are provided at positions which are assumed to be around the facial hair. For example, additional feature points 552 and 553 are arranged around the facial hair 551. Alternatively, instead of adding feature points as illustrated in FIG. 11A and FIG. 11B, existing feature points may be moved to positions around the glasses or facial hair. If it is possible to make further determinations as to the type and shape of the glasses or the position and area of the facial hair, coordinates of feature points may be changed according to the results of such determinations.

The presence of headwear is a distinctive but variable attribute. Therefore, as illustrated in FIG. 11C, as an attribute of the detected face, if headwear has a high resultant summation value (e.g., if it is determined that headwear is present), feature points located within a region which is assumed to correspond to the position of a head are removed. For example, in the normalized face image 520 of FIG. 11C, feature points surrounded by a dotted line 562 are removed. If there are a plurality of attributes, such as glasses, facial hair, and headwear, the above-described addition or removal of feature points is performed, accordingly. As illustrated in FIG. 11A to FIG. 11C, by adding or removing feature points according to the determined facial attribute, feature points best suited for the face to be subjected to similarity calculation can be set, and highly accurate calculation of feature points can be made. Thus, accuracy in person recognition can be further improved.

In the calculation of coordinates of these feature points, coordinates in the feature-point coordinate table 500 stored in the feature-point-coordinate-table holding unit 341 are used as initial values. Then, on the basis of these initial value, a computation for changing the positions of the feature point coordinates is made, according to the determined facial attribute. Alternatively, the feature point coordinates may be directly loaded from the CPU 110. The above-described computation and the direct loading from the CPU 110 may both be performed. A plurality of feature-point coordinate tables corresponding to determined facial attributes may be held in the feature-point-coordinate-table holding unit 341 so that an appropriate table can be selected according to the determined facial attribute. A computation for changing the positions of feature point coordinates may be made according to the resultant summation value.

Next, extraction of feature information at feature points set in a normalized face image will be described in detail with reference to drawings. After feature points are set in a normalized face image generated by the normalizing unit 320 (see, FIGS. 9A to 9C, FIGS. 10A to 10F, and FIGS. 11A to 11C), feature information is extracted for each of the feature points. In this embodiment of the present invention, a Gabor filter is used to extract feature information.

Figure 12A:
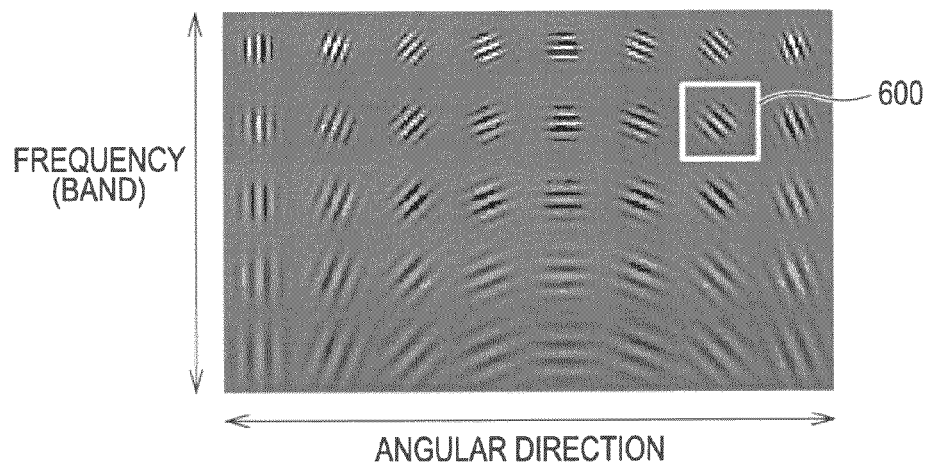
FIG. 12A illustrates a Gabor filter used to extract feature information at feature points.

FIG. 12A illustrates a Gabor filter used to extract feature information at feature points. The Gabor filter primarily uses two parameters, that is, a passband in which feature information is extracted, and an angle in the image to be filtered. In FIG. 12A, filters with different angles are illustrated in the horizontal direction, and filters with different passbands are illustrated in the vertical direction. In this example, the frequency increases upward in the vertical direction. The different angles indicated in the horizontal direction are obtained by 22.5-degree rotations. That is, different angles are set at regular intervals in such a manner as 0 degrees, 22.5 degrees, 45 degrees, 67.5 degrees, 90 degrees, 112.5 degrees, 135 degrees, and 157.5 degrees. In this embodiment of the present invention, filters of 40 different types (obtained by combinations of 5 different passbands and 8 different angles) are used as parameter settings, which allow extraction of feature information from faces with any attributes. In this embodiment of the present invention, 40 types of filters are used as parameter settings for targeting a wide range of average faces. However, the number of filters may be increased or decreased as necessary. If different angles are set at smaller intervals, more precise feature information can be extracted. For example, 10 different angles can be set at regular intervals in such a manner as 18 degrees, 36 degrees, 54 degrees, 72 degrees, . . . , and 162 degrees. Also, 12 different angles can be set at regular intervals in such a manner as 15 degrees, 30 degrees, 45 degrees, 60 degrees, . . . , and 165 degrees. If the types of angles are set at finer intervals, the amount of data to be processed increases as the number of types of angles increases. Thus, the types of angles are set in consideration of a balance with the processing speed and the level of performance of the processing apparatus.

Figure 12B:
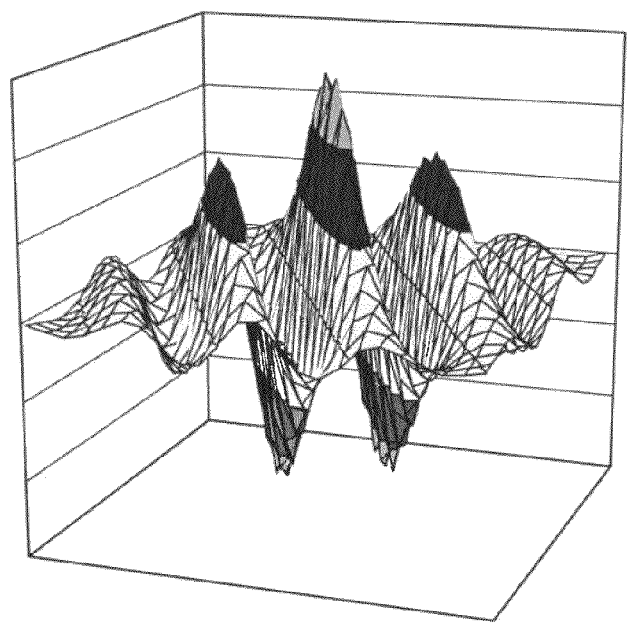
FIG. 12B is a graph showing a coefficient of a filter.

FIG. 12B is a graph showing a coefficient of a filter 600 in a three-dimensional space. The filter 600 is one of the 40 types of filters in the Gabor filter illustrated in FIG. 12A. The filter 600 extracts relatively high frequency components in a direction of 45 degrees in the image. As shown in FIG. 12B, an envelope of the coefficient of the filter 600 is a Gaussian curve which has a peak corresponding to an amplitude of the coefficient at a feature point.

Figure 13:
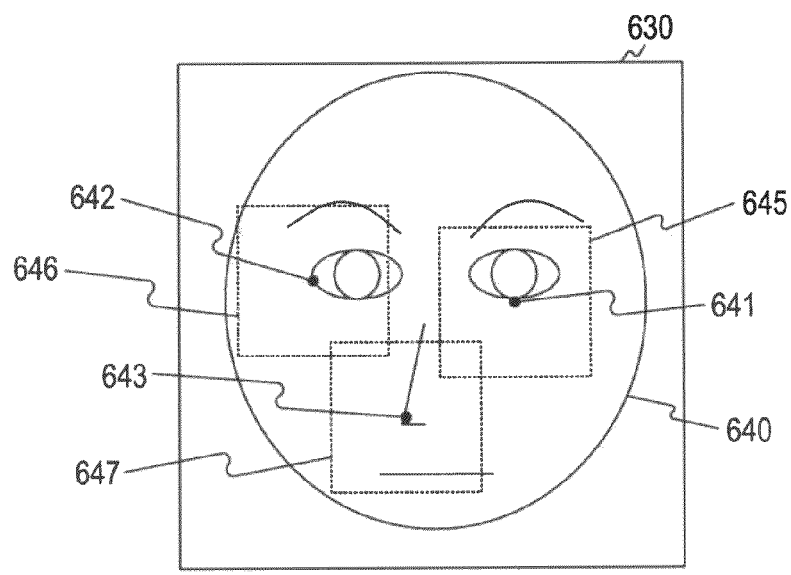
FIG. 13 illustrates a normalized face image.

FIG. 13 illustrates a normalized face image 630. Of a plurality of feature points set in a face 640 contained in the normalized face image 630, three feature points 641 to 643 will be described as examples.

The feature points 641 to 643 are set in the face 640 contained in the normalized face image 630. For example, the feature point 641 is located under the left eye. The feature point 642 is located near the tail of the right eye. The feature point 643 is located at the tip of the nose.

To extract feature information at a feature point using a Gabor filter, a pixel array including a pixel corresponding to the feature point and its neighboring pixels is used. For example, a 20-by-20 pixel array having a pixel corresponding to the feature point at its center can be used. For example, pixel arrays 645 to 647 for the feature points 641 to 643, respectively, are indicated by dotted-line rectangular frames.

Then, with a pixel array for a feature point and a coefficient of each passband and angle of a Gabor filter, a convolution computation of Expression 4 is performed as follows:

$$c(x, y) = \sum_{y=n0}^{n} \sum_{x=m0}^{m} p(x, y) \cdot g(x, y) \qquad \text{Expression 4}$$

where p(x,y) denotes brightness of the pixel array, g(x,y) denotes a Gabor filter coefficient, and c(x,y) denotes a resultant value of the convolution. Thus, a Gabor jet, which is feature information at a feature point, can be obtained as a significant value for recognizing a specific person. By performing this convolution computation sequentially for each of feature points, feature information (Gabor jet) at each feature point can be obtained.

In this embodiment of the present invention, the facial-feature-information extracting unit 350 loads initial parameter values for the Gabor filter, and changes these initial parameter values according to the facial attribute determined by the attribute determining unit 330. That is, according to the facial attribute determined by the attribute determining unit 330, the facial-feature-information extracting unit 350 changes the passband and feature extraction angle, which are parameters of the Gabor filter.

For example, as a facial attribute determined by the attribute determining unit 330, if "child" or "baby" has a high resultant summation value (if it is determined that the person is a child or baby), the parameters can be optimized by increasing the number of types of low-frequency band filters. On the other hand, if a resultant summation value for "adult" is high (i.e., if it is determined that the person is an adult), the parameters can be optimized by increasing the number of types of low-frequency band filters. Typically, faces of "child" and "baby" are smoother than "adult" faces. A smooth face means that there is no significant level difference on the surface of the face. Therefore, to extract feature information of a "child" or "baby" face, more emphasis is placed on lower-frequency bands than on higher-frequency bands. This makes it possible to extract more accurate feature information. Conversely, to extract feature information of an "adult" face, more accurate feature information can be extracted by placing more emphasis on higher-frequency bands than on lower-frequency bands. For example, if a resultant summation value for "smile" is high, a Gabor filter passband or a Gabor filter angle is changed to that best suited for "smile". Thus, by changing the Gabor filter according to the determined facial attribute, extraction of feature information at a feature point can be made with higher accuracy.

Here, the initial parameter values for the Gabor filter may either be held in an internal memory or set from the CPU 110.

Figure 14:
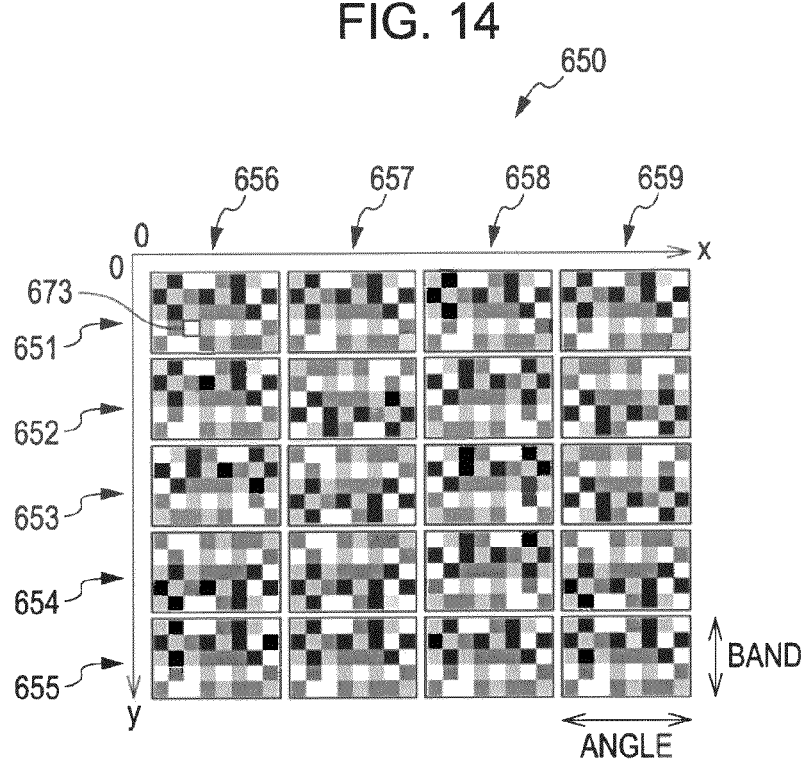
FIG. 14 schematically illustrates facial feature information which is a collection of feature information extracted using Gabor filters.

FIG. 14 schematically illustrates facial feature information 650 which is a collection of feature information extracted, using the Gabor filter of FIG. 12A, at each of feature points set in a normalized face image.

The facial feature information 650 is a collection of Gabor jets obtained when feature information at each of 20 feature points set in a normalized face image is extracted using a Gabor filter having 5 different passbands and 8 different angles. For example, the facial feature information 650 shows 20 Gabor jets that are extracted for respective feature points and arranged in a matrix with 5 rows (rows 651 to 655) and 4 columns (columns 656 to 659). The amount of each feature information corresponding to one Gabor jet is indicated by color gradations between black and white. The arrangement of the Gabor jets illustrated in FIG. 14 is only an example, and has nothing to do with a format in which the Gabor jets are stored. Similarity calculation using facial feature information will be described in detail below with reference to FIG. 18.

FIG. 15 schematically illustrates each information stored in the facial feature information RAM 390. The facial feature information RAM 390 stores facial feature information which is a collection of Gabor jets extracted for a normalized face image, and determined attributes of a face contained in the normalized face image. The facial feature information (contained in the column "facial feature information" 399) and the determined facial attributes (contained in the columns 392 to 398) are associated with an identification number (given in the column "ID No." 391) of the normalized face image. Examples of the facial attributes are those contained in the columns "smile/non-smile" 392, "male/female (sex)" 393, "adult/child (generation)" 394, "eye open/closed" 395, "face direction" 396, "facial hair" 397 (indicating the presence or absence of facial hair), and "glasses" 398 (indicating the presence or absence of glasses). A method for registering each feature information in the facial feature information RAM 390 will be described in detail below with reference to FIG. 28.

Figure 16:
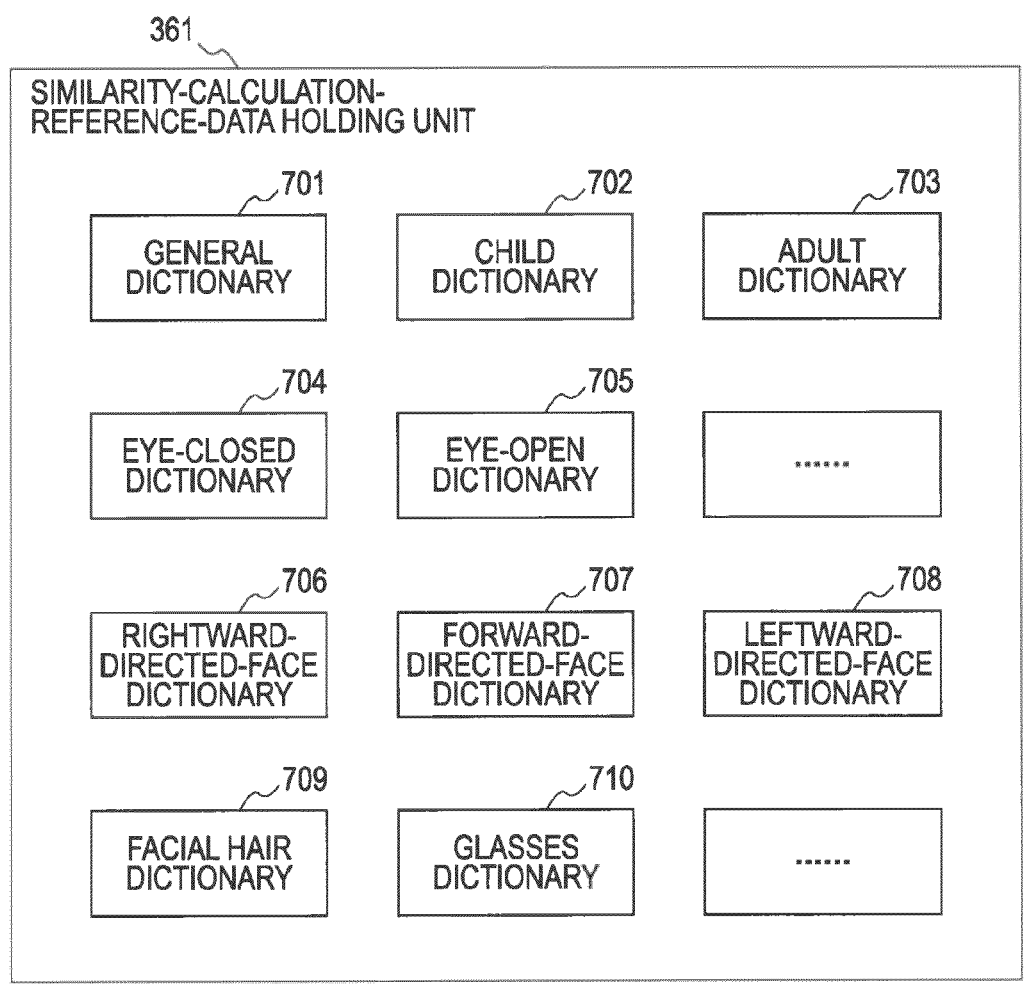
FIG. 16 schematically illustrates similarity calculation dictionaries held in a similarity-calculation-reference-data holding unit.

FIG. 16 schematically illustrates similarity calculation dictionaries held in the similarity-calculation-reference-data holding unit 361. The similarity-calculation-reference-data holding unit 361 is an internal memory which holds a finite number of similarity calculation dictionaries best suited for use in calculating similarity between values of facial feature information. Examples of the dictionaries held in the similarity-calculation-reference-data holding unit 361 include a general dictionary 701, a child dictionary 702, an adult dictionary 703, an eye-closed dictionary 704, an eye-open dictionary 705, a rightward-directed-face dictionary 706, a forward-directed-face dictionary 707, a leftward-directed-face dictionary 708, a facial hair dictionary 709, and a glasses dictionary 710. The general dictionary 701 holds only reference data that is obtained by averaging all attributes including age and sex, and thus is best suited for typical faces. On the other hand, the child dictionary 702 to glasses dictionary 710 in the similarity-calculation-reference-data holding unit 361 each are created by learning for a predetermined facial attribute only, and hold reference data best suited for the predetermined facial attribute.

Figure 17:
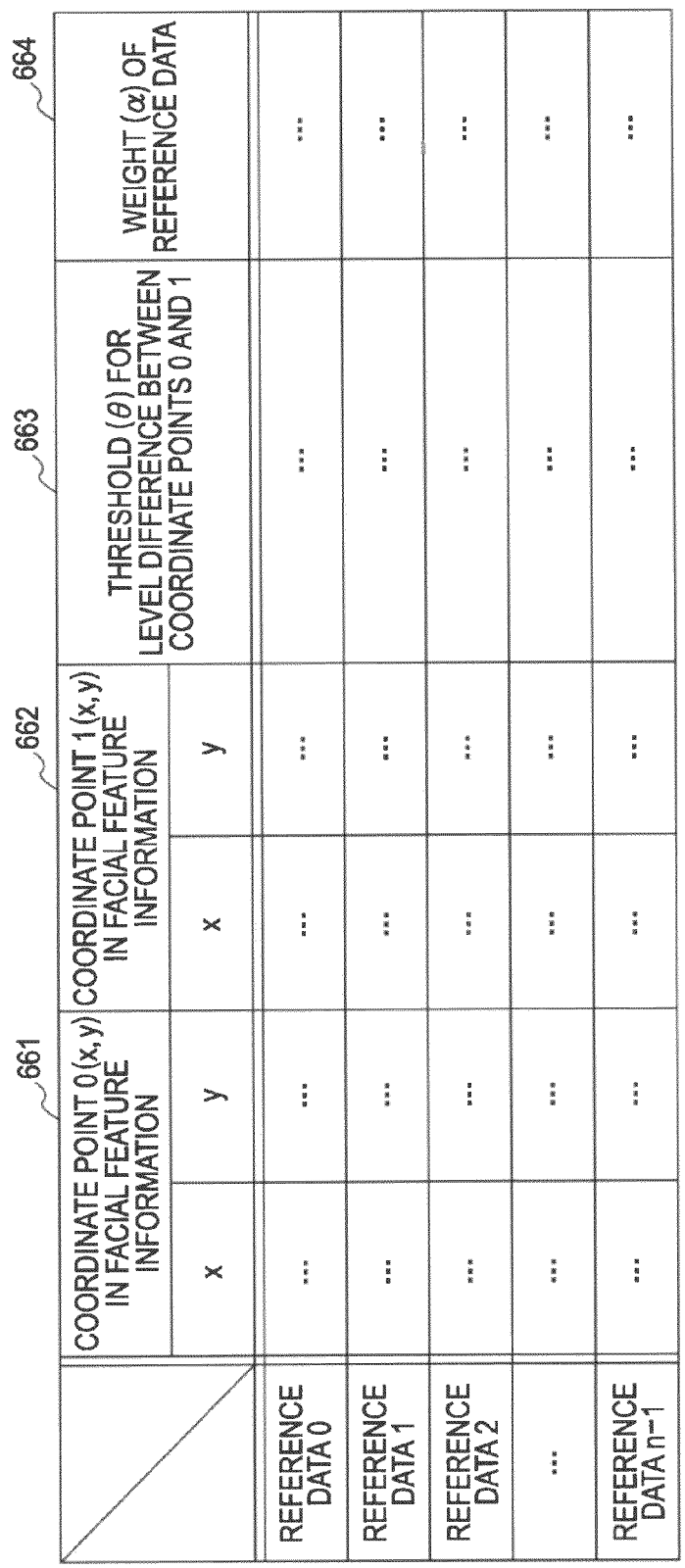
FIG. 17 illustrates a configuration of a similarity calculation dictionary for use in calculating, using Gabor jets, similarity of a target face to be subjected to determination.

FIG. 17 illustrates a configuration of a similarity calculation dictionary for use in calculating, using Gabor jets extracted from respective feature points set in a normalized face image, similarity of a target face to be subjected to determination (hereinafter referred to as "target face"). In this embodiment of the present invention, as in the case of the facial attribute determination, a correlation determination method based on difference values is used to calculate facial similarity.

Similarity-calculation reference data contained in a similarity calculation dictionary 660 includes a coordinate point 0(x,y) 661 and a coordinate point 1(x,y) 662 indicating two positions in facial feature information, a threshold ($\theta$) 663 for a level difference between the coordinate points 0 and 1, and a weight ($\alpha$) 664 of reference data. The weight ($\alpha$) 664 is a weighting factor added according to a result of comparison between the threshold ($\theta$) and the level difference between the coordinate points 0 and 1. The similarity calculation dictionary 660 stores "n" items of reference data, each reference data item including a combination of the above-described values. Instead of using coordinate points indicating two positions in facial feature information, other positional information may be held and used. For example, each Gabor jet may be assigned an identification number, so that the types of passband and angle of the Gabor jet, as well as the identification number of the Gabor jet, can be used as positional information.

Next, an example of similarity calculation performed on a target face using a similarity calculation dictionary will be described in detail with reference to drawings.

Figure 18:
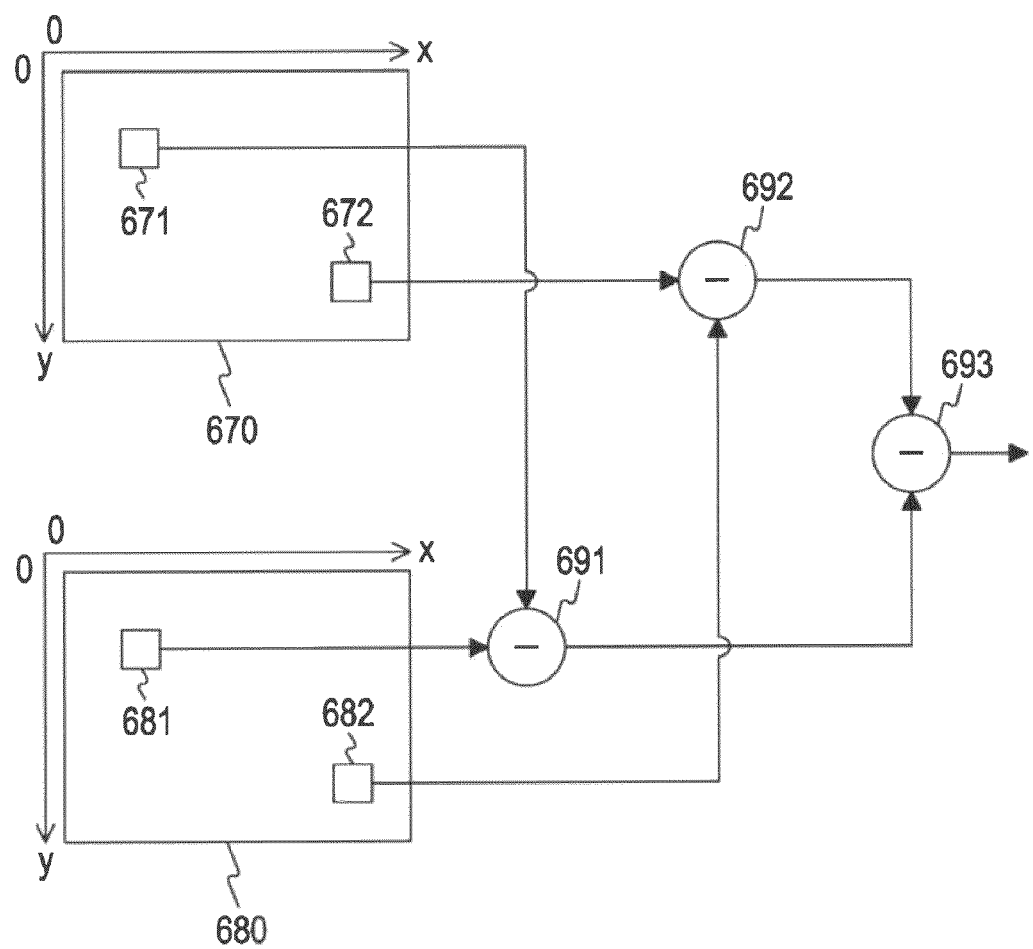
FIG. 18 schematically illustrates a method for calculating similarity of a target face using Gabor jets.

FIG. 18 schematically illustrates a method for calculating similarity of a target face using Gabor jets that are extracted at respective feature points set in a normalized face image.

Target-face feature information 670 is facial feature information including a plurality of Gabor jets extracted at respective feature points set in a normalized face image. Registered-face feature information 680 is facial feature information including a plurality of Gabor jets for a specific person's face stored in the facial feature information RAM 390. For example, the target-face feature information 670 and the registered-face feature information 680 correspond to the facial feature information 650 of FIG. 14. The target-face feature information 670 and the registered-face feature information 680 store the same number of Gabor jets in the same format.

In this example, similarity between the target-face feature information 670 and the registered-face feature information 680 is calculated using the similarity calculation dictionary 660. In the target-face feature information 670 and the registered-face feature information 680, the origin point is at the upper-left corner, the horizontal axis is the X-axis, and the vertical axis is the Y-axis.

For example, values of the coordinate point 0(x,y) 661 (see FIG. 17) stored in the first row (reference data 0) of the similarity calculation dictionary 660 correspond to a position 671 in the target-face feature information 670 and to a position 681 in the registered-face feature information 680. Also, values of the coordinate point 1(x,y) 662 stored in the above-described first row of the similarity calculation dictionary 660 correspond to a position 672 in the target-face feature information 670 and to a position 682 in the registered-face feature information 680. In the target-face feature information 670 and the registered-face feature information 680, a position corresponding to values of each of the coordinate point 0(x,y) 661 and the coordinate point 1(x,y) 662 is a position of one of feature information items constituting a single Gabor jet. For example, in the facial feature information 650 of FIG. 14, a position of such feature information item is a position of one feature information item (represented by a monochrome rectangle) 673 in one Gabor jet (located at the upper-left corner) corresponding to the intersection of the row 651 and the column 656.

First, a value of a score S for similarity calculation is set to zero. Then, computations using values contained in the reference data 0 in the similarity calculation dictionary 660 are performed. Specifically, a feature information value A0(0) at the position 671 located in the target-face feature information 670 and corresponding to the values of the coordinate point 0(x,y) 661 contained in the reference data 0 in the similarity calculation dictionary 660 and a feature information value B0(0) at the position 681 located in the registered-face feature information 680 and corresponding to the values of the coordinate point 0(x,y) 661 contained in the reference data 0 in the similarity calculation dictionary 660 are extracted. Then, an absolute value C0(0) of a difference between the extracted feature information values is calculated by the following expression (691 in FIG. 18):

$$C0(0) = |A0(0) - B0(0)|$$

Next, a feature information value A1(0) at the position 672 located in the target-face feature information 670 and corresponding to the values of the coordinate point 1(x,y) 662 contained in the reference data 0 in the similarity calculation dictionary 660 and a feature information value B1(0) at the position 682 located in the registered-face feature information 680 and corresponding to the values of the coordinate point 1(x,y) 662 contained in the reference data 0 in the similarity calculation dictionary 660 are extracted. Then, an absolute value C1(0) of a difference between the extracted feature information values is calculated by the following expression (692 in FIG. 18):

$$C1(0) = |A1(0) - B1(0)|$$

Next, an absolute value C2(0) of a difference between the calculated absolute values C0(0) and C1(0) is calculated by the following expression (693 in FIG. 18):

$$C2(0) = |C0(0) - C1(0)|$$

Next, the calculated absolute value C2(0) is compared to the value of the threshold ($\theta$) 663 contained in the reference data 0 in the similarity calculation dictionary 660 to determine whether the calculated absolute value C2(0) is greater than the value of the threshold ($\theta$) 663. If the calculated absolute value C2(0) is not greater than the value of the threshold ($\theta$) 663, the value of the weight ($\alpha$) 454 contained in the reference data 0 in the similarity calculation dictionary 660 is added to the score S. On the other hand, if the calculated absolute value C2(0) is greater than the value of the threshold ($\theta$) 663, the value of the weight ($\alpha$) 454 contained in the reference data 0 in the similarity calculation dictionary 660 is not added to the score S.

Then, the above-described computations are repeated by sequentially using values contained in the reference data 1 to reference data n−1 in the similarity calculation dictionary 660.

That is, to perform similarity calculation on the target-face feature information 670 and the registered-face feature information 680 by using the similarity calculation dictionary 660, values contained in the reference data 0 to n−1 in the similarity calculation dictionary 660 are sequentially used. Thus, C2(i) is calculated by Expressions 5 to 7 below:

$$C0(i) = |A0(i) - B0(i)| \qquad \text{Expression 5}$$

$$C1(i) = |A1(i) - B1(i)| \qquad \text{Expression 6}$$

$$C2(i) = |C0(i) - C1(i)| \qquad \text{Expression 7}$$

where the variable "i" is an integer from 0 to n−1, A0(i) denotes a feature information value at a position located in the target-face feature information 670 and corresponding to the coordinate point 0(x,y) 661 contained in reference data i, B0(i) denotes a feature information value at a position located in the registered-face feature information 680 and corresponding to the coordinate point 0(x,y) 661 contained in the reference data i, A1(i) denotes a feature information value at a position located in the target-face feature information 670 and corresponding to the coordinate point 1(x,y) 662 contained in the reference data i, and B1(i) denotes a feature information value at a position located in the registered-face feature information 680 and corresponding to the coordinate point 1(x,y) 662 contained in the reference data i. Then, it is determined whether the calculated C2(i) satisfies Expression 8 below:

$$C2(i) > \theta(i) \qquad \text{Expression 8}$$

where $\theta(i)$ denotes a value of the threshold ($\theta$) 663 contained in the reference data i.

If the calculated C2(i) satisfies Expression 8, the value of $\alpha(i)$ is not added to the score S. If the calculated C2(i) does not satisfy Expression 8, the value of $\alpha(i)$ is added to the score S. Here, $\alpha(i)$ denotes a value of the weight ($\alpha$) 664 contained in the reference data i.

After completion of the computations using values contained in the reference data n−1 in the similarity calculation dictionary 660, a score value, which is a resultant summation value, is output as a value indicating similarity. Thus, similarity is calculated, in two stages, between registered-face feature information and target-face feature information held in the form of Gabor jets.

Here, a score $S1_n(P)$ obtained after completion of the computations using values contained in the reference data 0 to n−1 in the similarity calculation dictionary 660 can be expressed by Expression 9 below:

$$S1_n(P) = \sum_{i=0}^{n-1} \alpha_i \cdot h\left( \left| P_0(x_{i0}, y_{i0}) - P_1(x_{i0}, y_{i0}) \right| - \left| P_0(x_{i1}, y_{i1}) - P_1(x_{i1}, y_{i1}) \right| - \theta_i \right) \qquad \text{Expression 9}$$

where $S1_n(P)$ denotes a resultant summation obtained by summation of the reference data 0 to n−1, $\alpha_i$ denotes a value of the weight (α) 664 contained in the reference data i, $P_0(x_{i0}, y_{i0})$ denotes a feature information value at a position located in the target-face feature information 670 and corresponding to the coordinate point 0(x,y) 661 contained in the reference data i, $P_1(x_{i0}, y_{i0})$ denotes a feature information value at a position located in the registered-face feature information 680 and corresponding to the coordinate point 0(x,y) 661 contained in the reference data i, $P_0(x_{i1}, y_{i1})$ denotes a feature information value at a position located in the target-face feature information 670 and corresponding to the coordinate point 1(x,y) 662 contained in the reference data i, $P_1(x_{i1}, y_{i1})$ denotes a feature information value at a position located in the registered-face feature information 680 and corresponding to the coordinate point 1(x,y) 662 contained in the reference data i, $\theta_i$ denotes a value of the threshold (θ) 663 contained in the reference data i, and n denotes the number of items of reference data. Additionally, h(z) denotes a function which gives 0 if z>0 is satisfied, and gives 1 if Z≦0 is satisfied.

For optimization, a value of the weight (α) 664 or a value of the threshold (θ) 663 may be changed according to a determined facial attribute or a resultant summation value for a facial attribute. For example, a value of the weight (α) 664 or a value of the threshold (θ) 663 can be multiplied by a value responsive to a determined facial attribute or a resultant summation value for a facial attribute.

Next, a similarity calculation dictionary used to calculate similarity of a target face will be described in detail with reference to drawings.

Figure 19:
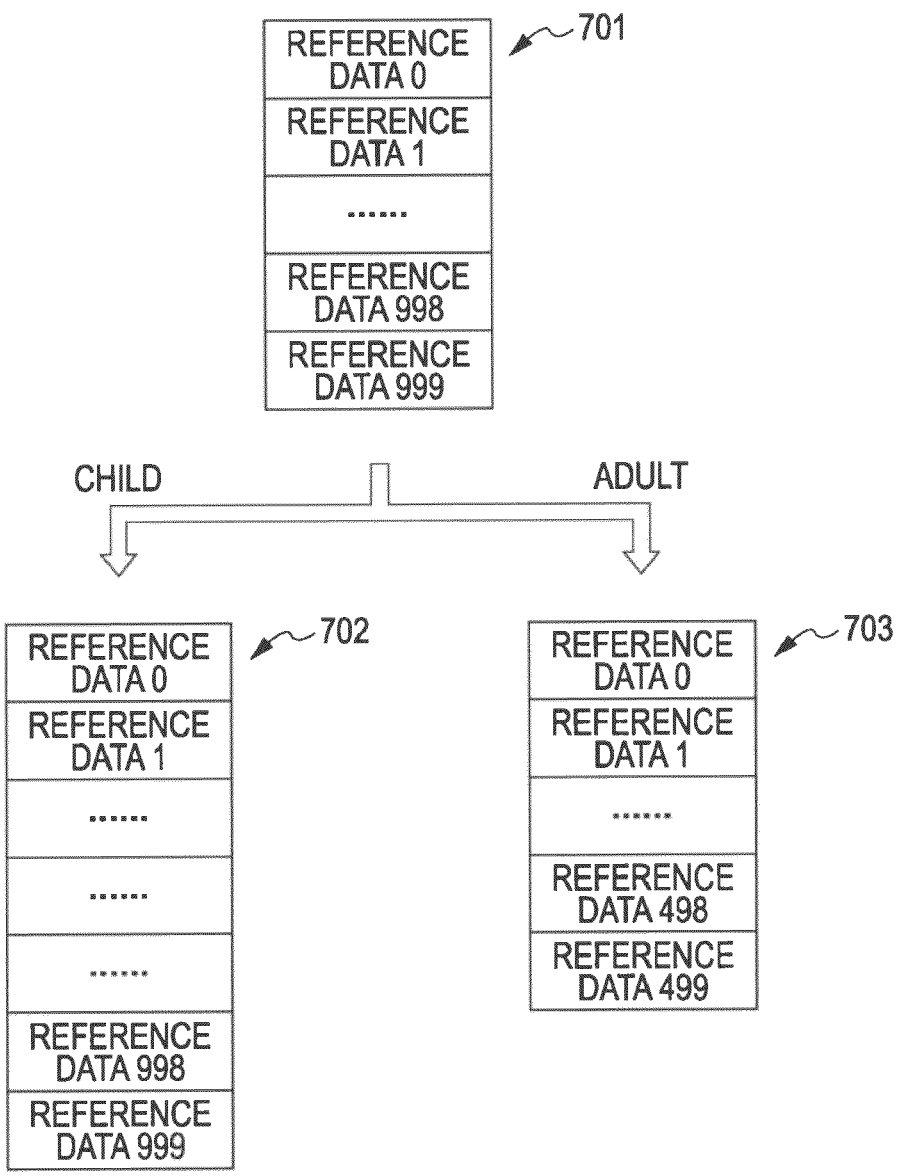
FIG. 19 illustrates similarity calculation dictionaries used to calculate similarity of a target face.

FIG. 19 illustrates similarity calculation dictionaries used to calculate similarity of a target face. In this example, a similarity calculation dictionary is selected according to the determined generation-related facial attribute.

For example, as illustrated in FIG. 19, the general dictionary 701 is initially used regardless of the determined facial attribute. The general dictionary 701 is a similarity calculation dictionary containing 1000 sets of similarity-calculation reference data for general similarity calculation. After completion of similarity calculation using the general dictionary 701, further similarity calculation is performed using the child dictionary 702 or the adult dictionary 703 depending on whether the generation-related facial attribute is determined to be "child" or "adult". The child dictionary 702 is a similarity calculation dictionary containing 1000 sets of similarity-calculation reference data best suited for use in calculating similarity of a child. The adult dictionary 703 is a similarity calculation dictionary containing 500 sets of similarity-calculation reference data best suited for use in calculating similarity of an adult. It is generally considered that individual differences among children are smaller than those among adults, and that it is difficult to extract children's feature information. Therefore, the child dictionary 702 contains 1000 sets of similarity-calculation reference data while the adult dictionary 703 contains 500 sets of similarity-calculation reference data. Thus, by holding a different number of sets of similarity-calculation reference data depending on the level of difficulty in extraction of feature information, an optimum number of sets of similarity-calculation reference data best suited for the target face can be used in similarity calculation. Highly accurate person recognition can thus be achieved.

Figure 20:
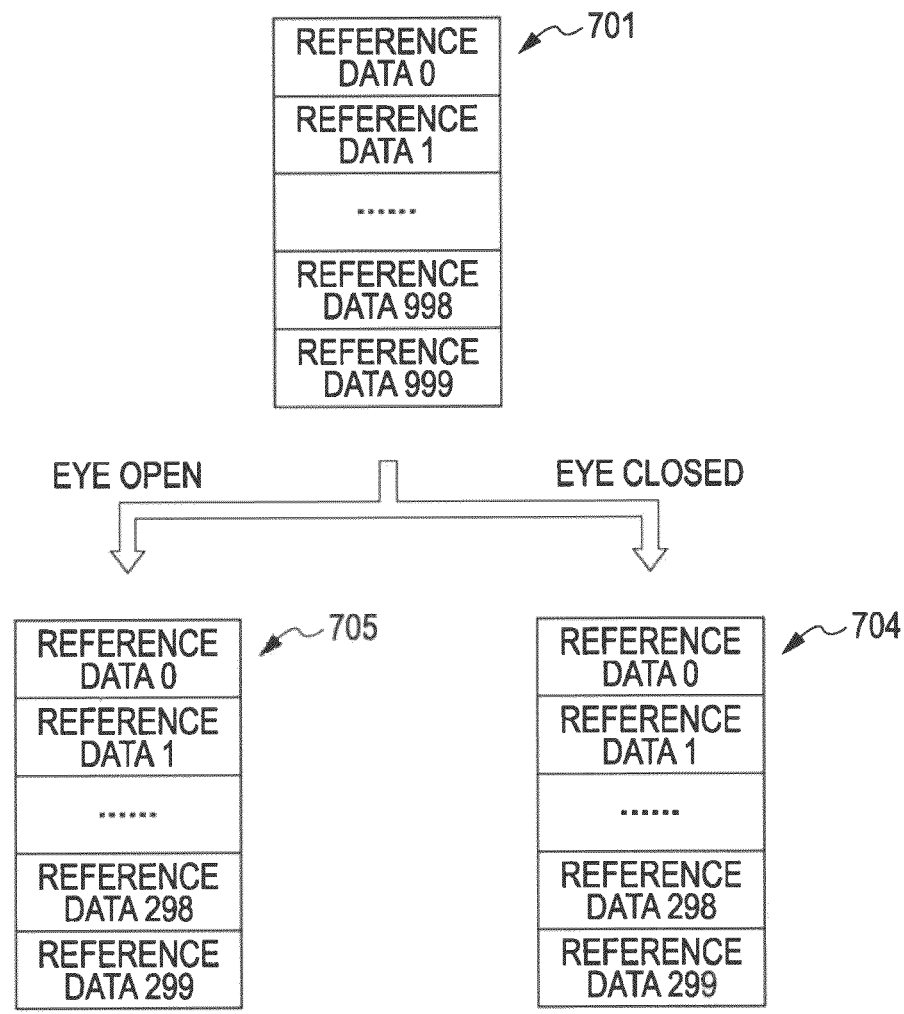
FIG. 20 illustrates other similarity calculation dictionaries used to calculate similarity of a target face.

FIG. 20 illustrates other similarity calculation dictionaries used to calculate similarity of a target face. In this example, a similarity calculation dictionary is selected according to the determined facial attribute related to the eye open/closed state.

For example, as illustrated in FIG. 20, the general dictionary 701 is initially used regardless of the determined facial attribute. Then, after completion of similarity calculation using the general dictionary 701, further similarity calculation is performed using the eye-open dictionary 705 or the eye-closed dictionary 704 depending on the determined facial attribute related to the eye open/closed state. The eye-open dictionary 705 is a similarity calculation dictionary containing 300 sets of similarity-calculation reference data best suited for use in calculating similarity of a face with open eyes. The eye-closed dictionary 704 is a similarity calculation dictionary containing 300 sets of similarity-calculation reference data best suited for use in calculating similarity of a face with closed eyes.

When similarity calculation is performed on a registered face for which "open" is stored in the column "eye open/closed" 395 in the facial feature information RAM 390 (see FIG. 15), if the corresponding facial attribute of a target face is determined to be "closed", although, for example, similarity calculation using the eye-closed dictionary 704 is performed after completion of similarity calculation using the general dictionary 701, the weight of similarity-calculation reference data contained in the eye-closed dictionary 704 may be reduced. Alternatively, after completion of similarity calculation using the general dictionary 701, the processing may be terminated without execution of similarity calculation using the eye-closed dictionary 704. Thus, by switching to similarity calculation best suited for the attribute of a registered face, more accurate similarity can be obtained.

Figure 21:
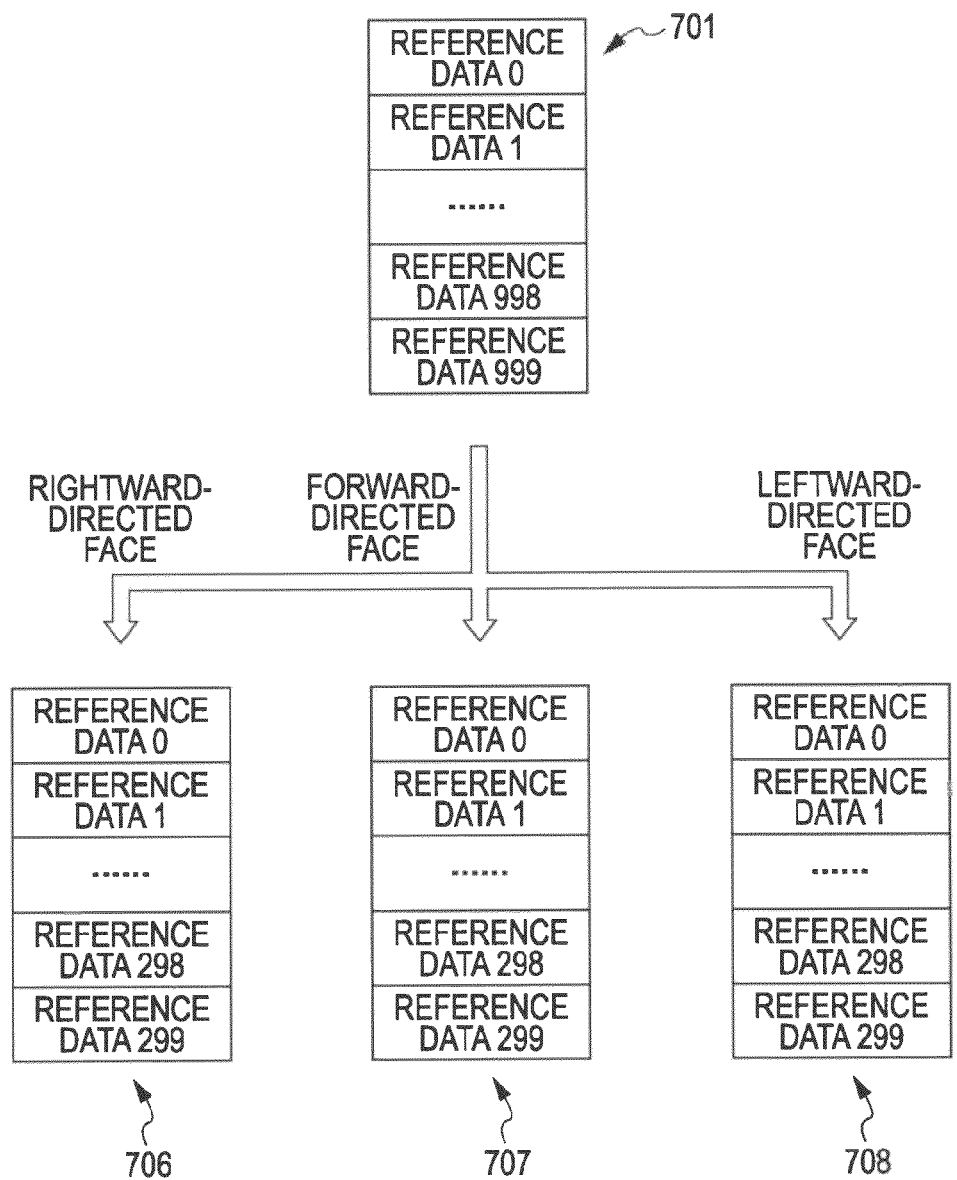
FIG. 21 illustrates other similarity calculation dictionaries used to calculate similarity of a target face.

FIG. 21 illustrates other similarity calculation dictionaries used to calculate similarity of a target face. In this example, a similarity calculation dictionary is selected according to the determined facial attribute related to the face direction.

For example, as illustrated in FIG. 21, the general dictionary 701 is initially used regardless of the determined facial attribute. Then, after completion of similarity calculation using the general dictionary 701, further similarity calculation is performed using the rightward-directed-face dictionary 706, the forward-directed-face dictionary 707, or the leftward-directed-face dictionary 708 depending on the determined facial attribute related to the face direction. The rightward-directed-face dictionary 706 is a similarity calculation dictionary containing 300 sets of similarity-calculation reference data best suited for use in calculating similarity of a face directed to the right. The forward-directed-face dictionary 707 is a similarity calculation dictionary containing 300 sets of similarity-calculation reference data best suited for use in calculating similarity of a face directed to the front. The leftward-directed-face dictionary 708 is a similarity calculation dictionary containing 300 sets of similarity-calculation reference data best suited for use in calculating similarity of a face directed to the left. Since an appropriate similarity calculation dictionary is selected according to the face direction, similarity calculation can be done by optimal weight assignment even if a registered face and a target face are not necessarily directed in the same direction. Thus, further accurate similarity can be obtained.

Figure 22:
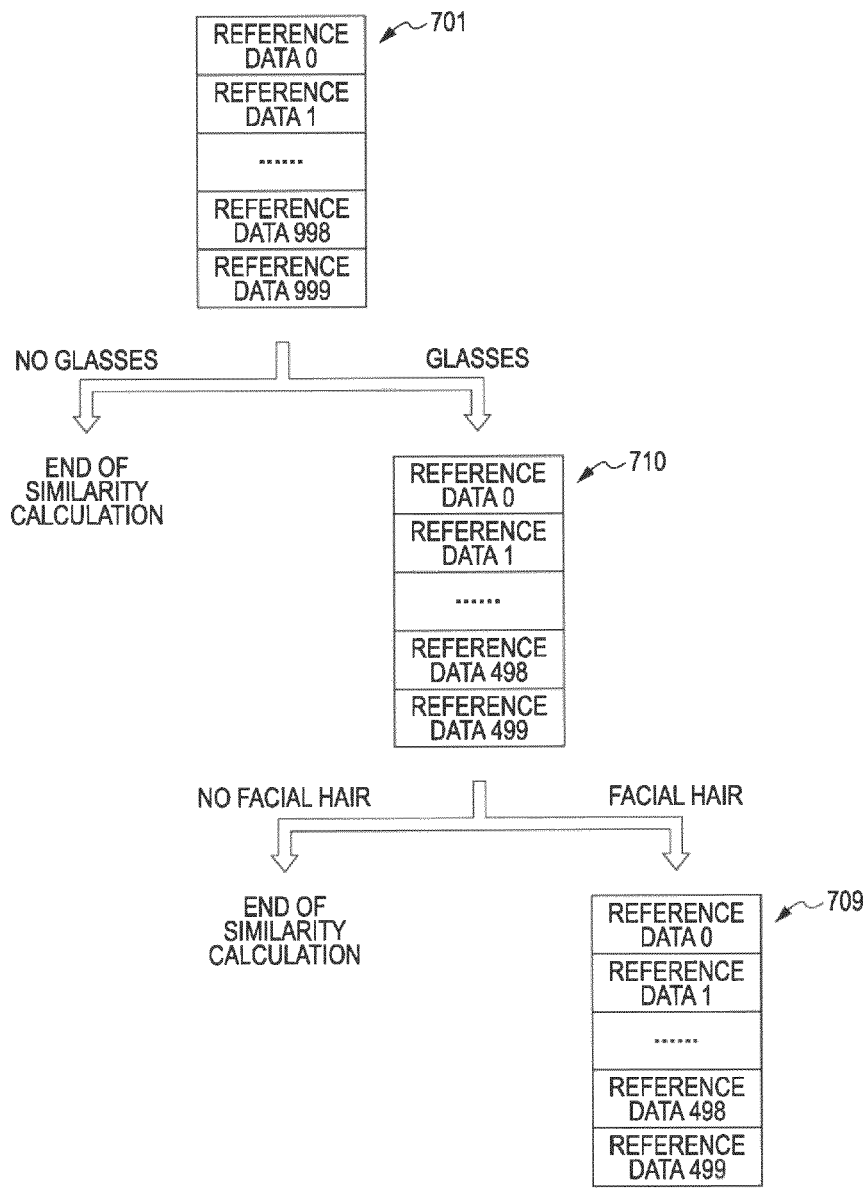
FIG. 22 illustrates other similarity calculation dictionaries used to calculate similarity of a target face.

FIG. 22 illustrates other similarity calculation dictionaries used to calculate similarity of a target face. In this example, a similarity calculation dictionary is selected according to the determined facial attribute related to presence or absence of glasses and the presence or absence of facial hair.

For example, as illustrated in FIG. 22, the general dictionary 701 is initially used regardless of the determined facial attribute. After completion of similarity calculation using the general dictionary 701, a selection is made as to whether further similarity calculation using the glasses dictionary 710 is to be performed or the similarity calculation is to be terminated, depending on the determined facial attribute related to the presence or absence of glasses. If the similarity calculation using the glasses dictionary 710 is performed and completed, another selection is made as to whether further similarity calculation using the facial hair dictionary 709 is to be performed or the similarity calculation is to be terminated, depending on the determined facial attribute related to the presence or absence of facial hair. The glasses dictionary 710 is a similarity calculation dictionary containing 500 sets of similarity-calculation reference data best suited for use in calculating similarity of a face with glasses. The facial hair dictionary 709 is a similarity calculation dictionary containing 500 sets of similarity-calculation reference data best suited for use in calculating similarity of a face with facial hair.

As described above, since a similarity calculation dictionary is selected according to the determined facial attribute, similarity calculation best suited for the target face can be performed. Thus, further accurate similarity can be obtained. Additionally, since similarity calculation using unnecessary reference data is not performed on the target face, the processing time can be reduced.

For facial attributes, such as hairstyle, glasses, and facial hair, which are likely to vary even for the same person depending on the shooting time and location, the weight of the corresponding similarity-calculation reference data may be reduced. Thus, similarity of the same person is not lost due to changes in facial attribute.

When a determined facial attribute of a target face is compared to a facial attribute stored in the facial feature information RAM 390, if the similarity therebetween is obviously low, the similarity calculation may be terminated. That is, when the similarity calculating unit 360 compares a facial attribute determined by the attribute determining unit 330 to a facial attribute stored in the facial feature information RAM 390, if the similarity therebetween is obviously low, the similarity calculating unit 360 notifies the controller 310 that the similarity calculation is to be terminated. Then, the controller 310 outputs instructions, to the feature-point calculating unit 340, the facial-feature-information extracting unit 350, and the similarity calculating unit 360, for terminating each processing on the target face. For example, when the degree of "child" of each facial attribute stored in the facial feature information RAM 390 is sufficiently high, if the degree of "child" of a determined facial attribute of a target face is determined to be sufficiently low, it can be determined that these are not the same person. Therefore, calculation of feature point coordinates, extraction of facial feature information, and similarity calculation can be terminated at an early stage. This can contribute to increased processing speed.

Next, an operation of the image pickup apparatus 100 according to an embodiment of the present invention will be described with reference to drawings.

Figure 23:
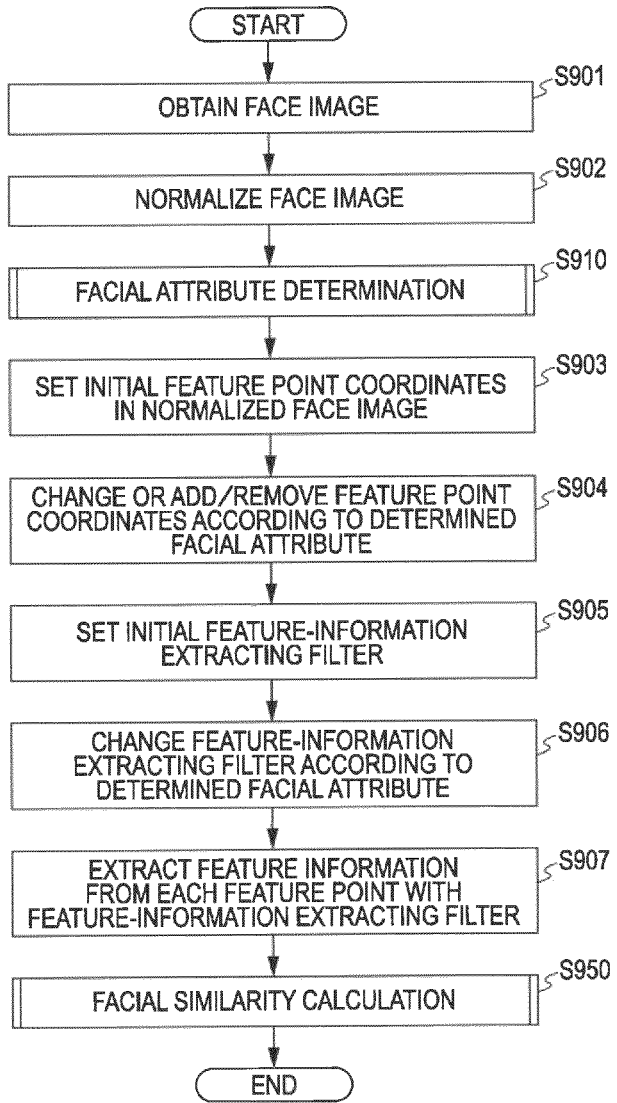
FIG. 23 is a flowchart illustrating a procedure of face recognition (person recognition) performed by the image pickup apparatus.

FIG. 23 is a flowchart illustrating a procedure of face recognition (person recognition) performed by the image pickup apparatus 100. The overall flow of this face recognition can be broadly divided into four types of processing, which are facial attribute determination, calculation of feature point coordinates, extraction of facial feature information, and similarity calculation.

First, the face recognizing section 300 obtains a face detection result output from the face detector 200. Then, according to the coordinates and size of a face region contained in the face detection result, the face recognizing section 300 reads a face image from an image stored in the image RAM 130 (step S901). The face recognizing section 300 may obtain the face detection result output from the face detector 200 via the CPU 110.

Next, the normalizing unit 320 normalizes the read face image such that the face has a predetermined size and both eyes of the face are aligned substantially horizontally (step S902). Then, the attribute determining unit 330 performs facial attribute determination on the normalized face image (step S910). This facial attribute determination will be described in detail below with reference to FIG. 24 and FIG. 25.

Next, the feature-point calculating unit 340 loads initial feature-point coordinates contained in a feature-point coordinate table held in the feature-point-coordinate-table holding unit 341. Then, the feature-point calculating unit 340 arranges the initial feature point coordinates as positions of feature points to be set in the normalized face image (step S903). The feature point coordinates may be set from the CPU 110. According to a determined facial attribute output from the attribute determining unit 330, the feature-point calculating unit 340 changes the initial feature point coordinates, or increases or decreases the number of feature point coordinates to calculate feature point coordinates (step S904).

Next, the facial-feature-information extracting unit 350 loads initial parameters of a Gabor filter (step S905). The parameters of the Gabor filter may be set from the CPU 110. According to the determined facial attribute output from the attribute determining unit 330, the facial-feature-information extracting unit 350 changes a passband or a feature-information extraction angle, each of which is a parameter of the Gabor filter (step S906). Then, the facial-feature-information extracting unit 350 uses the Gabor filter to extract feature information at each of the feature points calculated by the feature-point calculating unit 340 (step S907).

Next, the similarity calculating unit 360 performs similarity calculation (step S950). This similarity calculation will be described in detail below with reference to FIG. 26 and FIG. 27.

Figure 24:
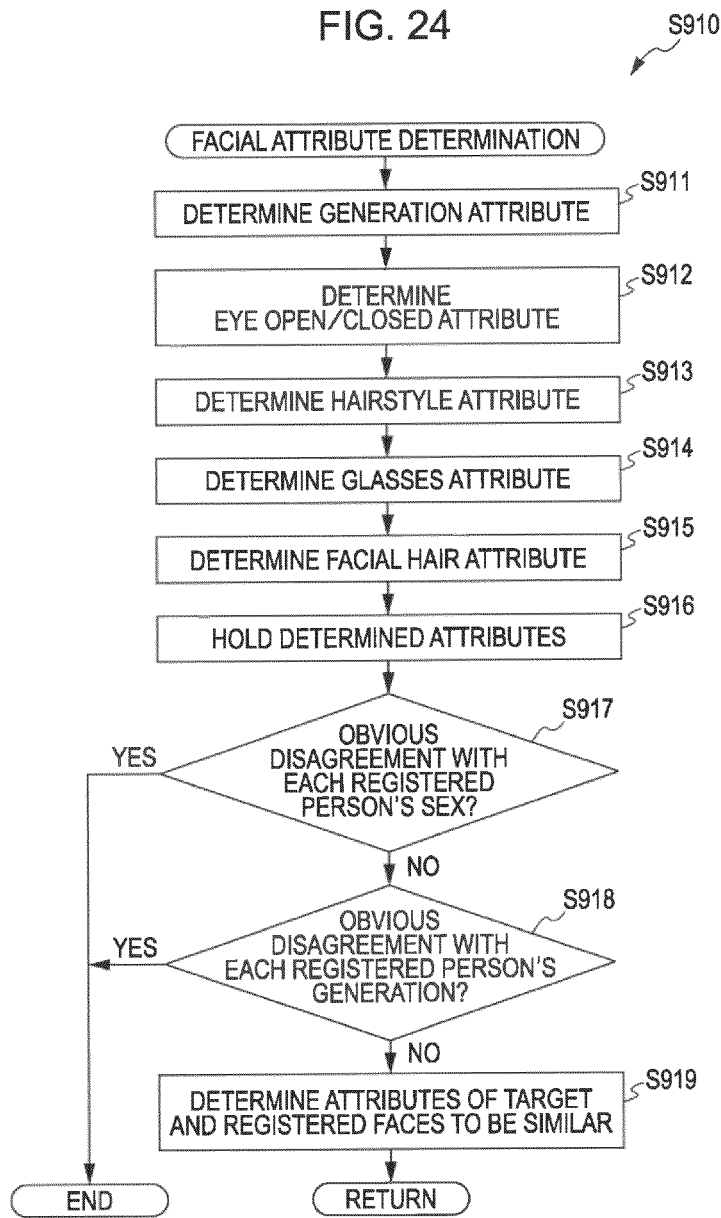
FIG. 24 is a flowchart illustrating a procedure of facial attribute determination involved in the procedure of face recognition performed by the image pickup apparatus.

FIG. 24 is a flowchart illustrating a procedure of facial attribute determination (corresponding to step S910 of FIG. 23) involved in the procedure of face recognition performed by the image pickup apparatus 100. In this example, facial attributes related to generation, eye open/closed state, hairstyle, the presence or absence of glasses, and the presence or absence of facial hair are determined. The determination of each facial attribute will be described in detail below with reference to FIG. 25.

First, the attribute determining unit 330 performs a generation attribute determination using a generation determination dictionary (step S911). Next, the attribute determining unit 330 performs an eye-open/closed attribute determination using an eye-open/closed determination dictionary (step S912). Next, the attribute determining unit 330 performs a hairstyle attribute determination using a hairstyle determination dictionary (step S913). Moreover, the attribute determining unit 330 performs a glasses attribute determination using a glasses determination dictionary (step S914). Additionally, the attribute determining unit 330 performs a facial-hair attribute determination using a facial-hair determination dictionary (step S915). Then, the attribute determining unit 330 holds these determined facial attributes (step S916). Alternatively, the attribute determining unit 330 may output these determined facial attributes to the CPU 110.

Next, similarity between a determined facial attribute of the target face and each determined facial attribute stored in the facial feature information RAM 390 is determined (steps S917 and S918). That is, it is determined whether a determined sex-related facial attribute of the target face obviously disagrees with each determined sex-related facial attribute stored in the facial feature information RAM 390 (step S917). Here, obvious disagreement in determined sex-related facial attribute refers to the cases except those where complete agreement is achieved or it is determined to be "ambiguous". Similarly, it is determined whether a determined generation-related facial attribute of the target face obviously disagrees with each determined generation-related facial attribute stored in the facial feature information RAM 390 (step S918).

If determined sex-related facial attributes obviously disagree with each other (Yes in step S917) or if determined generation-related facial attributes obviously disagree with each other (Yes in step S918), the operation of face recognition ends. On the other hand, if determined sex-related facial attributes do not obviously disagree with each other (No in step S917) and determined generation-related facial attributes do not obviously disagree with each other (No in step S918), the facial attributes of the target face are determined to be similar to the corresponding facial attributes stored in the facial feature information RAM 390 (step S919).

Although similarity is determined in terms of sex and gender-related attributes in this example, similarity may be determined in terms of other facial attributes.

Thus, for example, when all determined sex-related facial attributes stored in the facial feature information RAM 390 are "female", if the determined sex-related facial attribute of the target face is "male", it is very likely that the target face matches none of the registered faces. Likewise, when all determined generation-related facial attributes stored in the facial feature information RAM 390 are "adult", if the determined generation-related facial attribute of the target face is "child", it is very likely that the target face matches none of the registered faces. As described, if the facial attribute of the target face is contradictory to that of the registered faces, it is possible to determine that the target face matches none of the registered faces without performing calculation of feature point coordinates, extraction of facial feature information, and similarity calculation. Thus, if similarity between attributes is very low, the speed of face recognition can be increased by omitting execution of all the subsequent processing operations.

Figure 25:
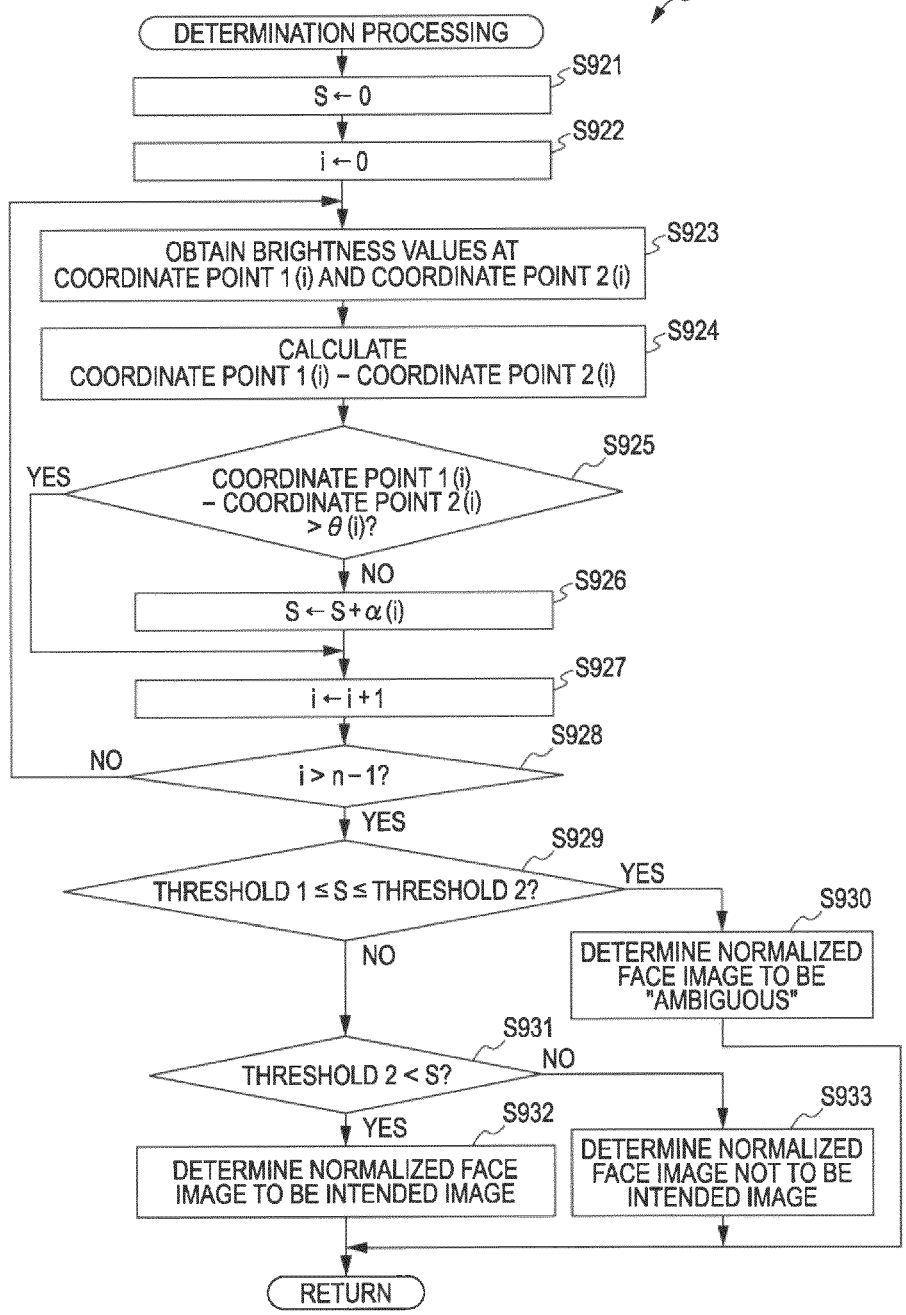
FIG. 25 is a flowchart illustrating a procedure of facial attribute determination performed by the image pickup apparatus.

FIG. 25 is a flowchart illustrating a procedure of facial attribute determination performed by the image pickup apparatus 100. This facial attribute determination corresponds to steps S911 to S915 of FIG. 24. Here, a facial attribute determination is made using the attribute determination dictionary 450 of FIG. 6.

First, a score S is reset to "0" (step S921) and a variable i is reset to "0" (step S922). Next, from brightness values extracted from a normalized face image, a brightness value A(i) corresponding to values of the coordinate point 0(x,y) 451 contained in the reference data i in the attribute determination dictionary 450 and a brightness value B(i) corresponding to values of the coordinate point 1(x,y) 452 contained in the reference data i in the attribute determination dictionary 450 are obtained (step S923). Then, a difference C(i) between the obtained brightness values is calculated using the following expression (step S924):

$$C(i)=A(i)-B(i)$$

Next, the calculated difference C(i) between the brightness values is compared to a value of the threshold (θ) 453 contained in the reference data i in the attribute determination dictionary 450, and it is determined whether the calculated difference C(i) is greater than the value of the threshold (θ) 453 (step S925). If the calculated difference C(i) is not greater than the value of the threshold (θ) 453 (No in step S925), a value of the weight (α) 454 contained in the reference data i in the attribute determination dictionary 450 is added to the score S (step S926). On the other hand, if the calculated difference C(i) is greater than the value of the threshold (θ) 453 (Yes in step S925), the value of the weight (α) 454 contained in the reference data i in the attribute determination dictionary 450 is not added to the score S and the processing proceeds to step S927.

Next, "1" is added to the variable i (step S927) and it is determined whether the variable i is greater than n−1 (step S928). If the variable i is not greater than n−1 (No in step S928), determination for each reference data in the attribute determination dictionary 450 has not yet been completed. Therefore, the processing returns to step S923, and steps S923 to S927 are performed again. On the other hand, if the variable i is greater than n−1 (Yes in step S928), it is further determined whether the value of the score S is within a range from a threshold 1 to a threshold 2 (step S929). The threshold 1 corresponds to the thresholds 461, 463, and 465 of FIG. 7, while the threshold 2 corresponds to the thresholds 462, 464, and 466 of FIG. 7.

If the value of the score S is within the range from the threshold 1 to the threshold 2 (Yes in step S929), the normalized face image is determined to be "ambiguous" about the facial attribute corresponding to the attribute determination dictionary 450 (step S930).

If the value of the score S is not within the range from the threshold 1 to the threshold 2 (No in step S929), it is further determined whether the value of the score S is greater than the threshold 2 (step S931). If the value of the score S is greater than the threshold 2 (Yes in step S931), it is determined that the normalized face image is an intended image for the facial attribute corresponding to the attribute determination dictionary 450 (step S932). On the other hand, if the value of the score S is smaller than the threshold 1 (No in step S931), it is determined that the normalized face image is not an intended image for the facial attribute corresponding to the attribute determination dictionary 450 (step S933).

Figure 26:
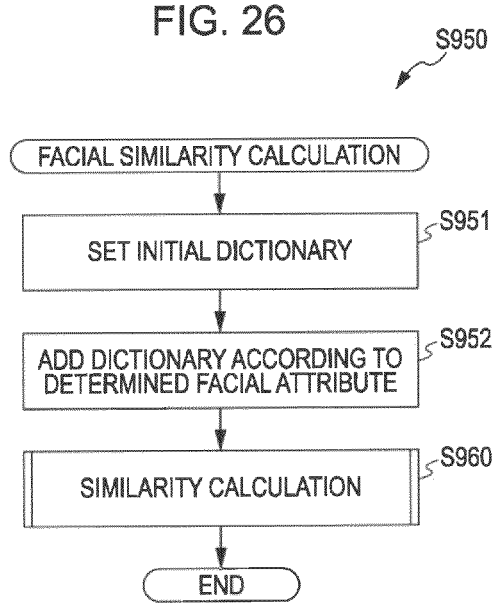
FIG. 26 is a flowchart illustrating a procedure of facial similarity calculation involved in the procedure of face recognition performed by the image pickup apparatus.

FIG. 26 is a flowchart illustrating a procedure of facial similarity calculation (step S950 of FIG. 23) involved in the procedure of face recognition performed by the image pickup apparatus 100.

First, the similarity calculating unit 360 obtains an initial similarity calculation dictionary from the similarity calculation dictionaries held in the similarity-calculation-reference-data holding unit 361 (step S951). For example, the general dictionary 701 is obtained from the similarity-calculation-reference-data holding unit 361 illustrated in FIG. 16. Next, according to the determined facial attribute output from the attribute determining unit 330, a similarity calculation dictionary is selected from those held in the similarity-calculation-reference-data holding unit 361 (step S952). Then, similarity calculation is performed using the initial similarity calculation dictionary and the selected similarity calculation dictionary (step S960). This similarity calculation will be described in detail below with reference to FIG. 27.

Figure 27:
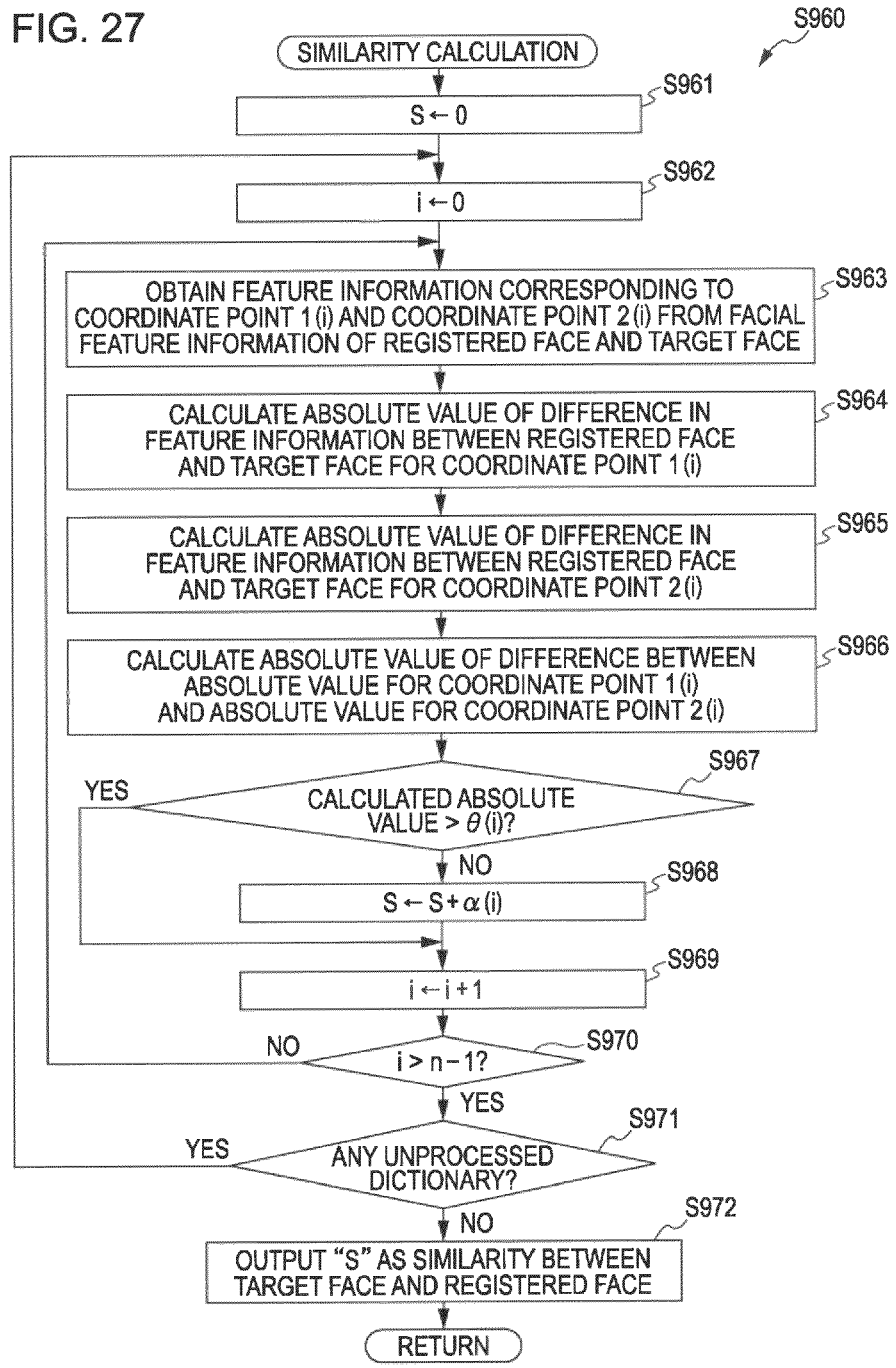
FIG. 27 is a flowchart illustrating a procedure of similarity calculation involved in the procedure of facial similarity calculation performed by the image pickup apparatus.

FIG. 27 is a flowchart illustrating a procedure of similarity calculation (corresponding to step S960 of FIG. 26) involved in the procedure of facial similarity calculation performed by the image pickup apparatus 100. In this example, the similarity calculation dictionary 660 of FIG. 17 is used to calculate similarity.

First, a score S is reset to "0" (step S961) and a variable i is reset to "0" (step S962). Next, a feature information value A0(i) contained in the target-face feature information and corresponding to values of the coordinate point 0(x,y) 661 contained in the reference data i in the similarity calculation dictionary 660 and a feature information value B0(i) contained in the registered-face feature information and corresponding to values of the coordinate point 0(x,y) 661 contained in the reference data i in the similarity calculation dictionary 660 are obtained. Additionally, a feature information value A1(i) contained in the target-face feature information and corresponding to values of the coordinate point 1(x, y) 662 contained in the reference data i in the similarity calculation dictionary 660 and a feature information value B1(i) contained in the registered-face feature information and corresponding to values of the coordinate point 1(x,y) 662 contained in the reference data i in the similarity calculation dictionary 660 are obtained (step S963).

Then, an absolute value C0(i) of a difference between the obtained feature information values is calculated using the following expression (step S964):

$$C0(i)=|A0(i)-B0(i)|$$

Additionally, an absolute value C1(i) of a difference between the obtained feature information values is calculated using the following expression (step S965):

$$C1(i)=|A1(i)-B1(i)|$$

Then, an absolute value C2(i) of a difference between the calculated absolute values C0(i) and C1(i) is calculated using the following expression (step S966):

$$C2(i)=|C0(i)-C1(i)|$$

Next, the calculated absolute value C2(i) is compared to a value of the threshold (θ) 663 contained in the reference data i in the similarity calculation dictionary 660. Then, it is determined whether the calculated absolute value C2(i) is greater than the value of the threshold (θ) 663 (step S967). If the calculated absolute value C2(i) is not greater than the value of the threshold (θ) 663 (No in step S967), a value of the weight (α) 454 contained in the reference data i in the similarity calculation dictionary 660 is added to the score S (step S968). On the other hand, if the calculated absolute value C2(i) is greater than the value of the threshold (θ) 663 (Yes in step S967), the value of the weight (α) 454 contained in the reference data i in the similarity calculation dictionary 660 is not added to the score S and the processing proceeds to step S969.

Next, "1" is added to the variable i (step S969) and it is determined whether the variable i is greater than n−1 (step S970). If the variable i is not greater than n−1 (No in step S970), determination for each reference data in the similarity calculation dictionary 660 has not yet been completed. Therefore, the processing returns to step S963, and steps S963 to S969 are performed again. On the other hand, if the variable i is greater than n−1 (Yes in step S970), it is further determined whether there is any similarity calculation dictionary which has not yet been subjected to similarity calculation (step S971). If there is such a similarity calculation dictionary (Yes in step S971), the processing returns to step S962 and similarity calculation using another similarity calculation dictionary is performed (steps S962 to S969). For example, as illustrated in FIG. 19, when a facial attribute is determined to be "child", there is the child dictionary 702 to be processed after completion of similarity calculation for the general dictionary 701. Therefore, similarity calculation using the child dictionary 702 is performed.

On the other hand, if there is no similarity calculation dictionary which has not yet been subjected to similarity calculation (No in step S971), a value of the score S is output to the CPU 110 as a value indicating similarity between the face corresponding to the target-face feature information and the face corresponding to the registered-face feature information (step S972).

Figure 28:
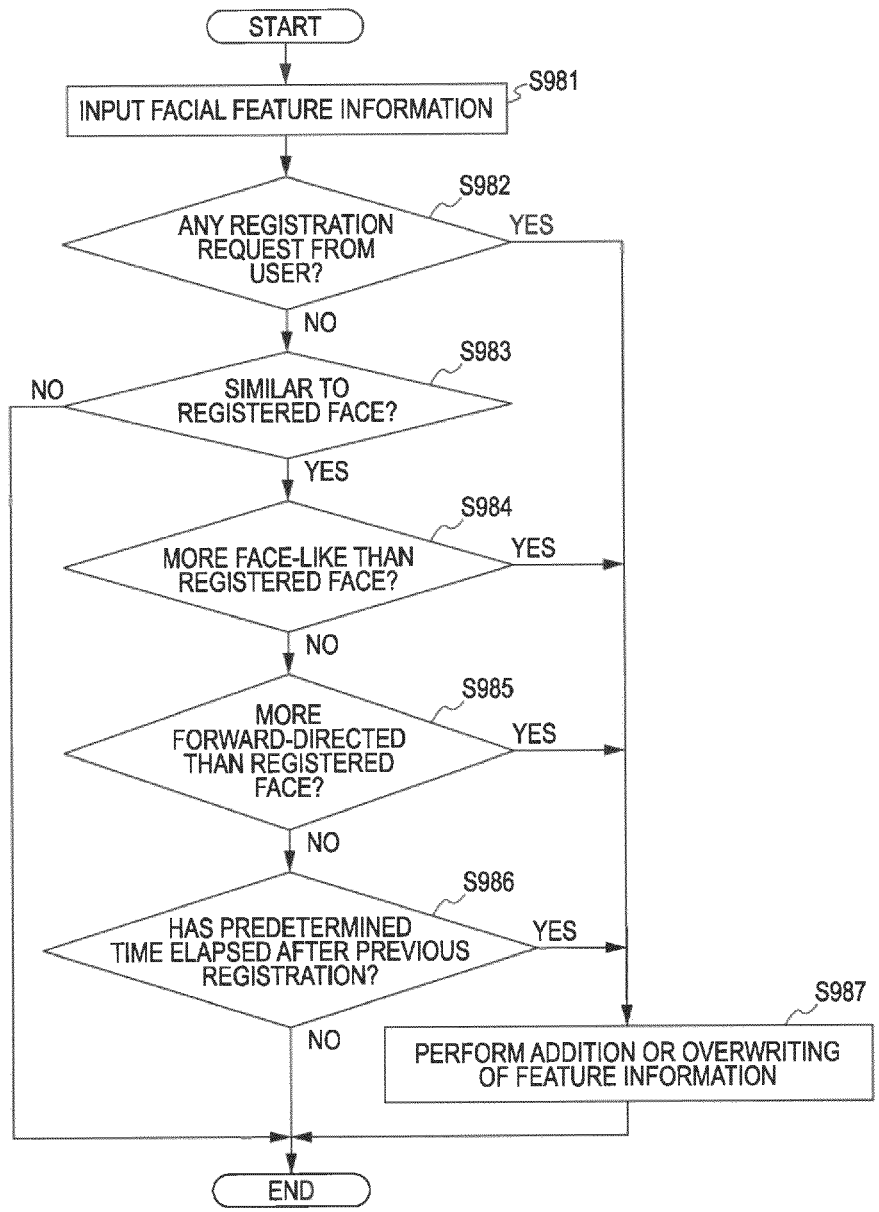
FIG. 28 is a flowchart illustrating a procedure of facial-feature-information registration performed by the image pickup apparatus.

FIG. 28 is a flowchart illustrating a procedure of facial-feature-information registration performed by the image pickup apparatus 100.

The facial-feature-information registering unit 370 inputs facial feature information from the facial-feature-information extracting unit 350 (step S981). Next, it is determined whether a registration request from the user has been received by the operation receiving unit 160 (step S982). If such a registration request from the user has not been received (No in step S982), it is determined, on the basis of similarity output from the similarity calculating unit 360, whether similarity between the facial feature information input from the facial-feature-information extracting unit 350 and facial feature information stored in the facial feature information RAM 390 is very high (step S983). If similarity between the facial feature information input from the facial-feature-information extracting unit 350 and that stored in the facial feature information RAM 390 is not very high (No in step S983), the operation of the facial-feature-information registration ends.

On the other hand, if similarity between the facial feature information input from the facial-feature-information extracting unit 350 and that stored in the facial feature information RAM 390 is very high (Yes in step S983), it is determined, on the basis of a face detection result output from the face detector 200 and held in the CPU 110, whether a face (target face) corresponding to the facial feature information input from the facial-feature-information extracting unit 350 is more face-like than a face (registered face) corresponding to the facial feature information stored in the facial feature information RAM 390 is (i.e., the target face's probability of being a human face is greater than the registered face's probability of being a human face) (step S984).

If the target face is not more face-like than the registered face is (No in step S984), it is further determined, on the basis also of the face detection result held in the CPU 110, whether the target face is a more forward-directed face than the registered face is (i.e., the target face's degree of being forward-directed is higher than the registered face's degree of being forward-directed) (step S985). If the target face is not a more forward-directed face than the registered face is (No in step S985), it is further determined whether the target face has been input after more than a predetermined time elapses from the registration of the registered face (step S986). In step S985, for determining whether the target face is a more forward-directed face than the registered face is, a face direction determined by the attribute determining unit 330 or a result of summation for the face direction may be used.

If a registration request from the user has been received (Yes in step S982), or when facial feature information input from the facial-feature-information extracting unit 350 is similar to that stored in the facial feature information RAM 390 (Yes in step S983), if the target face is more face-like than the registered face is (Yes step S984), the target face is a more forward-directed face than the registered face is (Yes step S985), or the target face has been input after more than a predetermined time elapses from the registration of the registered face (Yes in step S986), the facial-feature-information registering unit 370 adds the facial feature information input from the facial-feature-information extracting unit 350 to the existing facial feature information in the facial feature information RAM 390 or overwrites the existing facial feature information in the facial feature information RAM 390 with the facial feature information input from the facial-feature-information extracting unit 350 (step S987). At the same time, the facial-feature-information registering unit 370 adds the determined corresponding facial attributes to the existing data in the facial feature information RAM 390 or overwrites the existing data in the facial feature information RAM 390 with the determined corresponding facial attributes (step S987).

That is, if the facial feature information input from the facial-feature-information extracting unit 350 satisfies predetermined conditions (steps S983 to S986) for face registration, addition or overwriting of facial feature information is automatically performed inside the image pickup apparatus 100. Thus, the image pickup apparatus 100 can properly obtain the most current and appropriate facial feature information.

Figure 29:
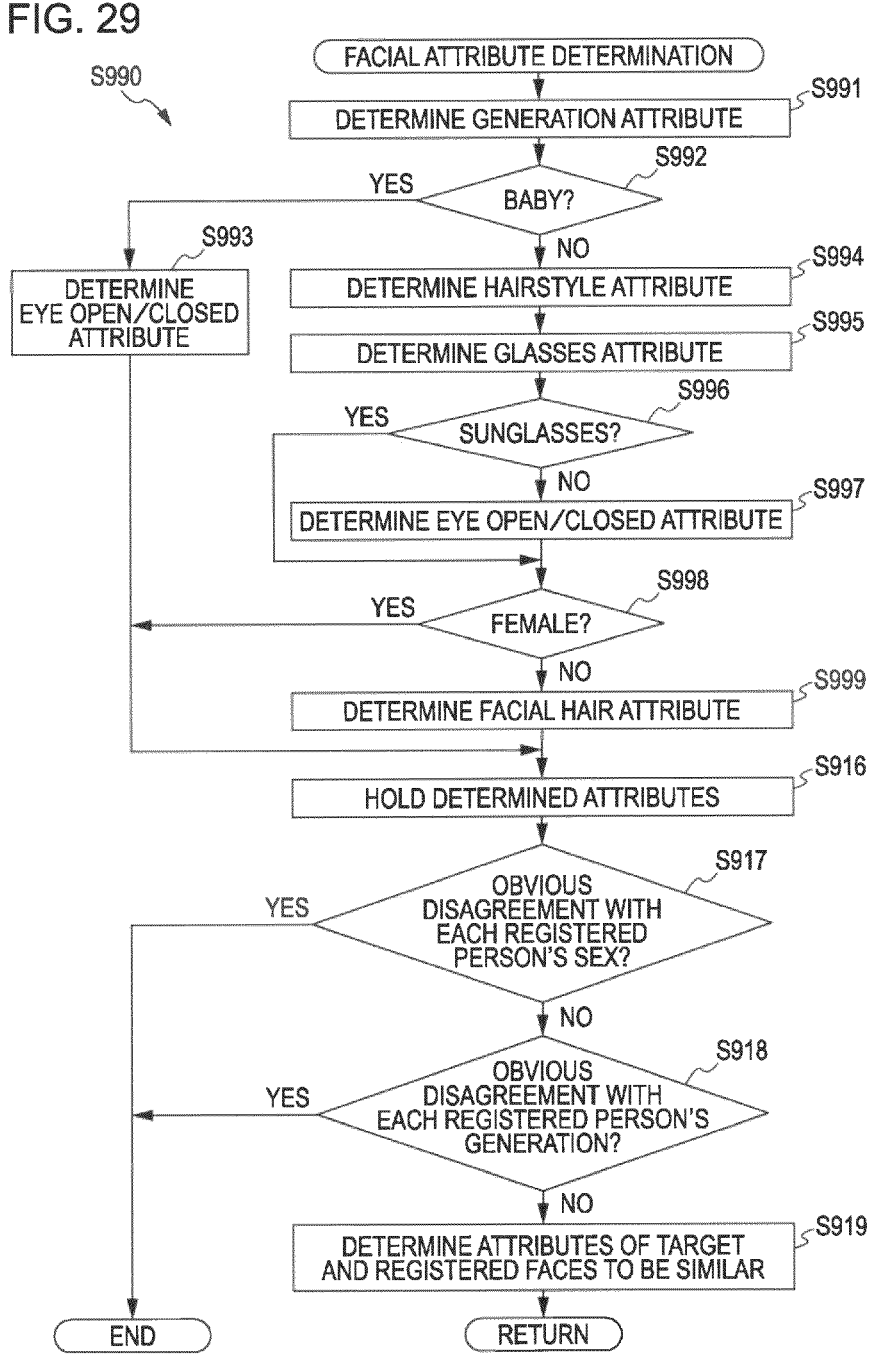
FIG. 29 is a flowchart illustrating a procedure of facial attribute determination involved in the procedure of face recognition performed by the image pickup apparatus.

FIG. 29 is a flowchart illustrating a procedure of facial attribute determination involved in the procedure of face recognition performed by the image pickup apparatus 100. The procedure of this facial attribute determination is a modification of that illustrated in FIG. 24. Steps S916 to S919 of FIG. 29 will not be described here, as they are the same as steps S916 to S919 of FIG. 24. In this example, facial attributes related to generation, eye open/closed state, hairstyle, the presence or absence of glasses, and the presence or absence of facial hair are selectively determined. The determination of generation-related facial attribute involves a determination as to whether the target person is a "baby". The determination of glasses-related facial attribute involves a determination as to whether the target person wears "sunglasses" (i.e., glasses with low transmittance).

First, the attribute determining unit 330 determines a generation-related facial attribute using a generation determination dictionary (step S991). Next, it is determined whether the generation-related facial attribute is determined to be "baby" (step S992). If the generation-related facial attribute is determined to be "baby" (Yes in step S992), since babies have preconditions such as "less distinctiveness in hairstyle", "wearing no glasses", "ambiguity in sex identity", and "having no facial hair", a determination of only the facial attribute related to an eye open/closed state is made (step S993) and determinations of other facial attributes are not made.

On the other hand, if the generation-related facial attribute is determined not to be "baby" (No in step S992), the attribute determining unit 330 determines a hairstyle-related facial attribute using a hairstyle determination dictionary (step S994) and further determines a glasses-related facial attribute using a glasses determination dictionary (step S995).

Next, it is determined whether the glasses-related facial attribute is determined to be "sunglasses" (step S996). If the glasses-related facial attribute is determined to be "sunglasses" (Yes in step S996), since it is difficult to determine the eye open/closed state of a face with sunglasses, the processing proceeds to step S998 without determining the facial attribute related to the eye open/closed state. On the other hand, if the glasses-related facial attribute is determined not to be "sunglasses" (No in step S996), a determination of the facial attribute related to the eye open/closed state is made (step S997).

Next, if the sex-related facial attribute is determined to be "female" (Yes in step S998), since females have a precondition of "having no facial hair", the processing proceeds to step S916 without determining the facial attribute related to the facial hair. On the other hand, if the sex-related facial attribute is determined not to be "female" (No in step S998), a determination of the facial attribute related to the facial hair is made (step S999).

Of various facial attributes such as those described above, there may be a contradictory or very rare combination of attributes, such as "child and facial hair" or "female and facial hair". Therefore, the determination of a facial attribute contradictory to that already determined may be omitted, so that processing time for such determination can be reduced and processing accuracy can be improved.

In the above embodiments of the present invention, the image pickup apparatus having image pickup units, such as a lens unit and an image sensor, is described as an example. The embodiments of the present invention are also applicable to an image processing apparatus not having such an image pickup unit. For example, the image processing apparatus is capable of performing the above-described face detection and face recognition on image data that is input from an external image storage medium or from an external apparatus via an input/output terminal. Additionally, facial attributes determined by the attribute determining unit 330, positions of feature points calculated by the feature-point calculating unit 340, facial feature information extracted by the facial-feature-information extracting unit 350, and similarity calculated by the similarity calculating unit 360 may be output via the input/output terminal to the external apparatus.

In the embodiments of the present invention described above, a face is detected as an object of the photographic subject and face recognition is performed. The embodiments of the present invention are also applicable to the cases where other objects are detected and object recognition is performed. For example, the embodiments of the present invention are applicable to various objects, such as pets and animals including cats and dogs, houses, and vehicles.

In the embodiments of the present invention described above, the Gabor filter is used as a feature-information extracting filter. The embodiments of the present invention are also applicable to the cases where other types of feature-information extracting filters are used to extract feature information.

As described above, according to the embodiments of the present invention, the determination of facial attributes (e.g., target person's expression, age or generation, sex, eye open/closed state, race, the presence or absence and type of glasses, the presence or absence and type of facial hair, the presence or absence and type of headwear, the presence or absence and type of accessory, hairstyle, and face direction) can be made on a region of a person's face contained in an image. The determination of a facial attribute contradictory to that already determined can be omitted, so that an effective result of facial attribute determination can be obtained efficiently.

Persons' faces desired by the user can be registered as facial feature information in the image pickup apparatus 100, so that the registered faces can be used in person recognition. Additionally, for a registered face of the same person, more appropriate facial feature information can be automatically selected and added to the registered information, or the registered information can be overwritten with the selected facial feature information. Thus, facial feature information most appropriate for the registered face can be stored.

Moreover, since coordinates of feature points for use in person recognition are changed according to the determined facial attribute, feature information best suited for the target face can be extracted.

Additionally, since a feature-information extracting filter for use in person recognition is changed according to the determined facial attribute, feature information best suited for the target face can be extracted.

Also, since similarity-calculation reference data for use in similarity calculation for person recognition is changed according to the determined facial attribute, similarity calculation best suited for the target face can be made. Thus, highly accurate person recognition can be achieved.

Additionally, depending on the determined facial attribute, similarity calculation for person recognition can be terminated in the middle without performing the subsequent processing. This makes it possible to reduce processing time and increase the speed of processing. In particular, when attention is focused on similarity between attributes and if contradictory attributes are found, it is possible to determine in an early stage that the registered and target faces are not faces of the same person. Thus, processing time can be significantly reduced.

Also, by extending similarity calculation for person recognition depending on the determined facial attribute, more accurate processing can be made even on a face whose similarity is not easily calculated.

Moreover, by recognizing a specific person's face from a plurality of faces contained in an image, various camera control operations, such as auto focusing, auto white balancing, auto exposure, auto stroboscopic flashing, and auto shutter, can be optimized for the specific person.

Additionally, quick and highly accurate person recognition can be made possible, and even a real-time image processing apparatus, such as an image pickup apparatus, is capable of outputting a specific person's face to the user. Even if a small image pickup apparatus, such as a digital still camera or a small camera for a cellular phone, does not have an image display device (e.g., liquid crystal panel) of sufficient size, the image pickup apparatus can inform the user of a specific person's face and allow the user to visually and easily recognize the specific person's face.

Additionally, since the embodiments of the present invention are applicable to image processing apparatuses besides image pickup apparatuses, the facial attribute determination and person recognition described above can be performed also on a person's face image input from an external apparatus.

Moreover, since various facial attributes, coordinates of facial feature points, and facial similarity can be generated as data associated with an image, a wealth of information can be automatically provided to the user.

Additionally, by using various facial attributes, coordinates of facial feature points, and facial similarity, an image of a specific individual can be quickly retrieved from many moving and still images in a database.

The embodiments of the present invention are presented as examples for embodying the present invention. Although the correspondence between the features of the claims and the specific elements disclosed in the embodiments is discussed below, the correspondence is not limited to this. That is, various modifications can be applied thereto without departing from the scope of the present invention.

In some embodiments of the present invention, object-feature-information storage means corresponds to, for example, the facial feature information RAM 390; object detecting means corresponds to, for example, the face detector 200; attribute determining means corresponds to, for example, the attribute determining unit 330; and similarity calculating means corresponds to, for example, the similarity calculating unit 360.

In some embodiments of the present invention, image inputting means corresponds to, for example, the lens unit 121 and the image sensor 122.

In some embodiments of the present invention, feature-point determining means corresponds to, for example, the feature-point calculating unit 340.

In an embodiment of the present invention, feature-point-coordinate-table holding means corresponds to, for example, the feature-point-coordinate-table holding unit 341.

In an embodiment of the present invention, normalizing means corresponds to, for example, the normalizing unit 320.

In an embodiment of the present invention, feature-information extracting means corresponds to, for example, the facial-feature-information extracting unit 350.

In an embodiment of the present invention, feature-information registering means corresponds to, for example, the facial-feature-information registering unit 370.

In an embodiment of the present invention, object-attribute storage means corresponds to, for example, the facial feature information RAM 390.

In an embodiment of the present invention, image pickup means corresponds to, for example, the lens unit 121 and the image sensor 122.

In some embodiments of the present invention, the step of inputting an image is carried out, for example, by the lens unit 121 and the image sensor 122; the step of detecting an object is carried out, for example, by the face detector 200; the determining an attribute corresponds to, for example, step S910 or step S990; the step of determining feature points corresponds to, for example, step S904; and the step of calculating similarity corresponds to, for example, step S950.

The processing steps described in the embodiments of the present invention may be regarded as a method having the series of steps described above, a program for causing a computer to execute the series of steps described above, or a storage medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   object-feature-information storage means for storing feature information of a predetermined object;
   image inputting means for inputting an image;
   object detecting means for detecting an object contained in the input image;
   attribute determining means for determining an attribute of the detected object;
   feature-point determining means for determining, according to the determined attribute, positions of feature points to be set in the input image; and
   similarity calculating means for calculating, by comparing feature information stored in the object-feature-information storage means to feature information at feature points set in the input image, similarity between an object corresponding to the feature information stored in the object-feature-information storage means and the detected object, the similarity calculating means adding a weight corresponding to the object to the similarity when a comparison between the feature information stored in the object-feature-information storage means to the feature information at feature points set in the input image exceeds a threshold.

2. The image processing apparatus according to claim 1, further comprising feature-point-coordinate-table holding means for holding initial positions of feature points to be set in the input image, wherein, according to the determined attribute, the feature-point determining means moves the initial positions of the feature points or increases or decreases the number of the initial positions of the feature points so as to determine positions of feature points to be set in the input image.

3. The image processing apparatus according to claim 1, further comprising normalizing means for normalizing an object image that is an image of the detected object and a surrounding area thereof such that the detected object is located at a predetermined position, wherein the feature-point determining means determines positions of feature points to be set in the normalized object image, according to the determined attribute.

4. The image processing apparatus according to claim 1, further comprising feature-information extracting means for extracting feature information at feature points set in the input image.

5. The image processing apparatus according to claim 4, wherein the feature-information extracting means uses a feature-information extracting filter to extract feature information for each of the feature points set in the input image, with respect to each local image that is an image including a feature point and an area surrounding the feature point.

6. The image processing apparatus according to claim 5, wherein, according to the determined attribute, the feature-information extracting means changes parameters of the feature-information extracting filter for use in extracting the feature information.

7. The image processing apparatus according to claim 6, wherein the feature-information extracting filter is a Gabor filter; and according to the determined attribute, the feature-information extracting means changes a passband or a feature-information extraction angle, each of which is a parameter of the Gabor filter.

8. The image processing apparatus according to claim 4, further comprising feature-information registering means for determining, according to the calculated similarity, whether feature information extracted for the input image satisfies a predetermined condition and storing, if it is determined that the predetermined condition is satisfied, the feature information extracted for the input image in the object-feature-information storage means.

9. The image processing apparatus according to claim 8, wherein, if it is determined that the predetermined condition is satisfied, the feature-information registering means stores the determined attribute as well as the feature information extracted for the input image in the object-feature-information storage means.

10. The image processing apparatus according to claim 1, wherein the similarity calculating means uses a plurality of weak discriminators to compare feature information stored in the object-feature-information storage means to feature information at feature points set in the input image, thereby calculating the similarity.

11. The image processing apparatus according to claim 10, wherein, according to the determined attribute, the similarity calculating means changes the number or type of the weak discriminators used to calculate the similarity.

12. The image processing apparatus according to claim 1, further comprising object-attribute storage means for storing an attribute of a predetermined object, wherein the similarity calculating means compares the determined attribute to an attribute stored in the object-attribute storage means so as to determine similarity in attribute between the detected object and an object whose attribute is stored in the object-attribute storage means and, according to the determined similarity in attribute, determines whether to calculate similarity of the detected object.

13. The image processing apparatus according to claim 1, wherein the object detecting means detects a person's face contained in the input image.

14. The image processing apparatus according to claim 13, wherein the attribute determining means determines at least one of a facial expression, an age or a generation, sex, an open or closed state of eyes, race, the presence or absence and type of glasses, the presence or absence and type of facial hair, the presence or absence and type of headwear, the presence or absence and type of accessory, hairstyle, and a face direction as an attribute of the detected person's face.

15. An image processing apparatus comprising:
object-feature-information storage means for storing feature information of a predetermined object;
image inputting means for inputting an image;
object detecting means for detecting an object contained in the input image;
attribute determining means for determining an attribute of the detected object, the attribute determining means sequentially determines a plurality of attributes of the detected object and selects an attribute to be subsequently determined according to an attribute already determined;
feature-point determining means for determining, according to the determined attribute, positions of feature points to be set in the input image; and
similarity calculating means for calculating, by comparing feature information stored in the object-feature-information storage means to feature information at feature points set in the input image, similarity between an object corresponding to the feature information stored in the object-feature-information storage means and the detected object.

16. An image processing apparatus comprising:
object-feature-information storage means for storing feature information of a predetermined object;
image inputting means for inputting an image;
object detecting means for detecting an object contained in the input image;
attribute determining means for determining an attribute of the detected object;
similarity calculating means for comparing, by using a plurality of weak discriminators whose number or type is determined according to the determined attribute, feature information stored in the object-feature-information storage means to feature information at feature points set in the input image, thereby calculating similarity between an object corresponding to the feature information stored in the object-feature-information storage means and the detected object.

17. An image pickup apparatus comprising:
object-feature-information storage means for storing feature information of a predetermined object;
image pickup means for converting light incident from a subject into a picked-up image;
object detecting means for detecting an object contained in the picked-up image;
attribute determining means for determining an attribute of the detected object;
feature-point determining means for determining, according to the determined attribute, positions of feature points to be set in the input image; and
similarity calculating means for comparing feature information stored in the object-feature-information storage means to feature information at feature points set in the picked-up image, thereby calculating similarity between an object corresponding to the feature information stored in the object-feature-information storage means and the detected object, the similarity calculating means adding a weight corresponding to the object to the similarity when a comparison between the feature information stored in the object-feature-information storage means to the feature information at feature points set in the input image exceeds a threshold.

18. A similarity calculating method for an image processing apparatus including object-feature-information storage means for storing feature information of a predetermined object, the method comprising:
- inputting an image;
- detecting an object contained in the input image;
- determining an attribute of the detected object;
- determining, according to the determined attribute, positions of feature points to be set in the input image; and
- calculating, by comparing feature information stored in the object-feature-information storage means to feature information at feature points set in the input image, similarity between an object corresponding to the feature information stored in the object-feature-information storage means and the detected object, the calculating including adding a weight corresponding to the object to the similarity when a comparison between the feature information stored in the object-feature-information storage means to the feature information at feature points set in the input image exceeds a threshold.

19. A non-transitory computer readable medium encoded with a program for causing a computer to execute a similarity calculating method for an image processing apparatus including object-feature-information storage means for storing feature information of a predetermined object, the method comprising:
- inputting an image;
- detecting an object contained in the input image;
- determining an attribute of the detected object;
- determining, according to the determined attribute, positions of feature points to be set in the input image; and
- calculating, by comparing feature information stored in the object-feature-information storage means to feature information at feature points set in the input image, similarity between an object corresponding to the feature information stored in the object-feature-information storage means and the detected object, the calculating including adding a weight corresponding to the object to the similarity when a comparison between the feature information stored in the object-feature-information storage means to the feature information at feature points set in the input image exceeds a threshold.

20. An image processing apparatus comprising:
- an object-feature-information storage unit configured to store feature information of a predetermined object;
- an image inputting unit configured to input an image;
- an object detecting unit configured to detect an object contained in the input image;
- an attribute determining unit configured to determine an attribute of the detected object;
- a feature-point determining unit configured to determine, according to the determined attribute, positions of feature points to be set in the input image; and
- a similarity calculating unit configured to calculate, by comparing feature information stored in the object-feature-information storage unit to feature information at feature points set in the input image, similarity between an object corresponding to the feature information stored in the object-feature-information storage unit and the detected object, the similarity calculating unit configured to add a weight corresponding to the object to the similarity when a comparison between the feature information stored in the object-feature-information storage means to the feature information at feature points set in the input image exceeds a threshold.

21. An image processing apparatus comprising:
- an object-feature-information storage unit configured to store feature information of a predetermined object;
- an image inputting unit configured to input an image;
- an object detecting unit configured to detect an object contained in the input image;
- an attribute determining unit configured to determine an attribute of the detected object;
- a similarity calculating unit configured to compare, by using a plurality of weak discriminators whose number or type is determined according to the determined attribute, feature information stored in the object-feature-information storage unit to feature information at feature points set in the input image, thereby calculating similarity between an object corresponding to the feature information stored in the object-feature-information storage unit and the detected object.

22. An image pickup apparatus comprising:
- an object-feature-information storage unit configured to store feature information of a predetermined object;
- an image pickup unit configured to convert light incident from a subject into a picked-up image;
- an object detecting unit configured to detect an object contained in the picked-up image;
- an attribute determining unit configured to determine an attribute of the detected object;
- a feature-point determining unit configured to determine, according to the determined attribute, positions of feature points to be set in the input image; and
- a similarity calculating unit configured to compare feature information stored in the object-feature-information storage unit to feature information at feature points set in the picked-up image, thereby calculating similarity between an object corresponding to the feature information stored in the object-feature-information storage unit and the detected object, the similarity calculating unit configured to add a weight corresponding to the object to the similarity when a comparison between the feature information stored in the object-feature-information storage means to the feature information at feature points set in the input image exceeds a threshold.

* * * * *